(12) United States Patent (10) Patent No.: US 12,686,531 B2
Ishii et al. (45) Date of Patent: Jul. 21, 2026

(54) LIQUID CONTAINER AND LIQUID CONTAINER WITH CONTENT LIQUID

(71) Applicant: YOSHINO KOGYOSHO CO., LTD., Tokyo (JP)

(72) Inventors: Yusuke Ishii, Tokyo (JP); Hiromichi Saito, Tokyo (JP); Koji Watase, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 265 days.

(21) Appl. No.: 18/560,489

(22) PCT Filed: Jun. 27, 2022

(86) PCT No.: PCT/JP2022/025606
§ 371 (c)(1),
(2) Date: Nov. 13, 2023

(87) PCT Pub. No.: WO2023/008046
PCT Pub. Date: Feb. 2, 2023

(65) Prior Publication Data
US 2024/0246726 A1 Jul. 25, 2024

(30) Foreign Application Priority Data

Jul. 30, 2021 (JP) ................................. 2021-125840
Oct. 29, 2021 (JP) ................................. 2021-178247
(Continued)

(51) Int. Cl.
*B65D 23/06* (2006.01)
*B29C 49/00* (2006.01)
(Continued)

(52) U.S. Cl.
CPC ............ *B65D 23/06* (2013.01); *B29C 49/071* (2022.05); *B29C 49/10* (2013.01); *B65D 1/023* (2013.01);
(Continued)

(58) Field of Classification Search
CPC .... B65D 23/06; B65D 47/122; B65D 1/0246; B65D 1/023; B65D 25/42; B65D 25/54;
(Continued)

(56) References Cited

U.S. PATENT DOCUMENTS

| | | | |
|---|---|---|---|
| 1,529,360 A | 3/1925 | Johnson | |
| 4,890,770 A * | 1/1990 | Haga ................... | B65D 47/122 |
| | | | 222/571 |

(Continued)

FOREIGN PATENT DOCUMENTS

| | | |
|---|---|---|
| CN | 110329630 A | 10/2019 |
| EP | 0 378 047 A1 | 7/1990 |

(Continued)

OTHER PUBLICATIONS

Jun. 26, 2025 Extended European Search report issued in European Patent Application No. 22849116.3.

(Continued)

*Primary Examiner* — Frederick C Nicolas
(74) *Attorney, Agent, or Firm* — Oliff PLC

(57) ABSTRACT

A liquid container and a liquid container with content liquid are easy to sort and dispose of, while preventing dripping of the liquid from a nozzle to the outside. A liquid container includes a container body configured to compartmentally form an accommodation space for content liquid, a tubular nozzle configured to be connected to an upper portion of the container body and guide the content liquid to the outside, and a liquid recovery channel configured to return the content liquid on the radial outside of the nozzle into the (Continued)

accommodation space. The container body, the nozzle, and the liquid recovery channel are formed by integral molding.

13 Claims, 21 Drawing Sheets

(30)         Foreign Application Priority Data

Jan. 28, 2022   (JP) ................................. 2022-012391
Feb. 28, 2022   (JP) ................................. 2022-030499

(51) Int. Cl.

| | |
|---|---|
| *B29C 49/10* | (2006.01) |
| *B29L 31/00* | (2006.01) |
| *B65D 1/02* | (2006.01) |
| *B65D 25/42* | (2006.01) |
| *B65D 25/54* | (2006.01) |
| *B65D 41/56* | (2006.01) |
| *B65D 47/12* | (2006.01) |

(52) U.S. Cl.
CPC ........... *B65D 1/0246* (2013.01); *B65D 25/42* (2013.01); *B65D 25/54* (2013.01); *B65D 41/565* (2013.01); *B65D 47/122* (2013.01); *B29C 2949/0715* (2022.05); *B29C 2949/077* (2022.05); *B29C 2949/0778* (2022.05); *B29C 2949/0794* (2022.05); *B29L 2031/7158* (2013.01)

(58) Field of Classification Search
CPC ................. B65D 41/565; B29C 49/10; B29C 2949/0715; B29C 2949/077; B29C 2949/0778; B29C 2949/0794; B29C 49/071; B29L 2031/7158
See application file for complete search history.

(56)         References Cited

U.S. PATENT DOCUMENTS

| | | | | |
|---|---|---|---|---|
| 4,989,757 A | * | 2/1991 | Krall ..................... | B29C 49/071 |
| | | | | 222/111 |
| 7,857,168 B2 | * | 12/2010 | Horstman .............. | B65D 1/023 |
| | | | | 222/566 |
| 8,636,171 B1 | | 1/2014 | Dattilo | |
| 2008/0283552 A1 | | 11/2008 | Penny | |
| 2010/0108635 A1 | | 5/2010 | Horstman et al. | |

FOREIGN PATENT DOCUMENTS

| | | | |
|---|---|---|---|
| JP | S61-180950 | U | 11/1986 |
| JP | S62-90343 | U | 6/1987 |
| JP | S63-64640 | U | 4/1988 |
| JP | 2000-079960 | A | 3/2000 |
| JP | 2001-199465 | A | 7/2001 |
| JP | 5094620 | B2 | 12/2012 |
| JP | 2013-173548 | A | 9/2013 |
| JP | 2015-009451 | A | 1/2015 |
| JP | 2015120520 | A | 7/2015 |
| JP | 2015-155328 | A | 8/2015 |
| JP | 2017-114553 | A | 6/2017 |
| JP | 2018-188171 | A | 11/2018 |
| JP | 2021-130496 | A | 9/2021 |
| JP | 2023-002099 | A | 1/2023 |

OTHER PUBLICATIONS

Jul. 17, 2025 Office Action issued in Chinese Patent Application No. 202280034937.3.
Dec. 24, 2024 Office Action issued in Japanese Patent Application No. 2021-125840.
Jan. 18, 2024 International Preliminary Report on Patentability issued in International Patent Application No. PCT/JP2022/025606.
Sep. 6, 2022 International Search Report issued in International Patent Application No. PCT/JP2022/025606.
May 13, 2025 Office Action issued in Japanese Patent Application No. 2021-178247.
Sep. 2, 2025 Office Action issued Japanese Application No. 2021-178247.
Oct. 7, 2025 Office Action issued in Japanese Application No. 2022-012391.
Oct. 21, 2025 Office Action issued in Japanese Application No. 2022-030499.
Mar. 19, 2026 Office Action issued in Japanese Application No. 2022-030499.
Mar. 19, 2026 Office Action issued in Japanese Application No. 2022-012391.
Mar. 31, 2026 Office Action issued in Japanese Application No. 2022-012391.

* cited by examiner

SECTION A-A

SECTION B-B

SECTION C-C

SECTION D-D

FIG. 17                                                                700
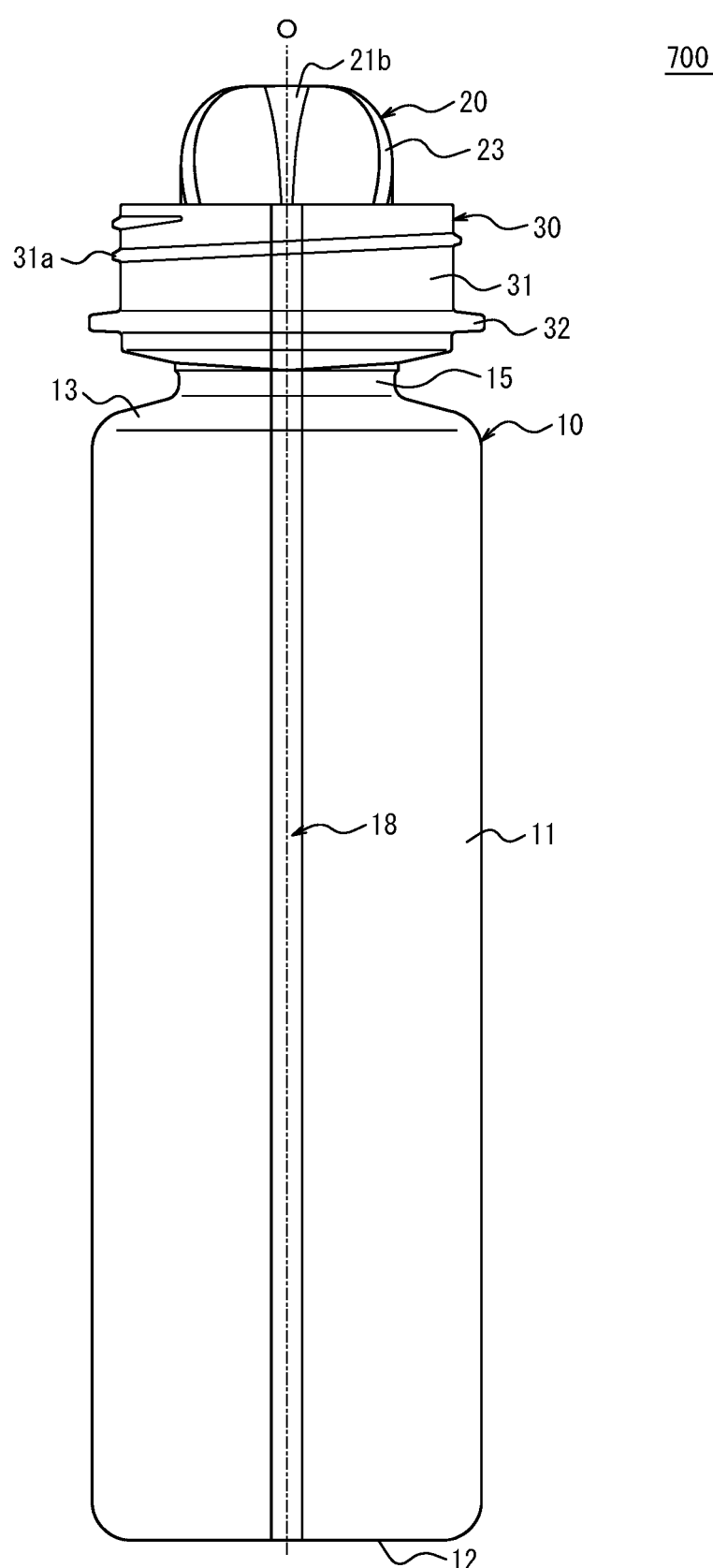

SECTION E-E

LIQUID CONTAINER AND LIQUID CONTAINER WITH CONTENT LIQUID

CROSS-REFERENCE TO RELATED APPLICATION

This application claims priority to Japanese Patent Application No. 2021-125840 filed on Jul. 30, 2021, Japanese Patent Application No. 2021-178247 filed on Oct. 29, 2021, Japanese Patent Application No. 2022-12391 filed on Jan. 28, 2022, and Japanese Patent Application No. 2022-30499 filed on Feb. 28, 2022, the entire contents of which are incorporated herein by reference.

TECHNICAL FIELD

This disclosure relates to a liquid container including a container body and a nozzle, and a liquid container with content liquid.

BACKGROUND

Conventionally, as containers that contain content liquid with relatively high viscosity, such as liquid laundry detergent or fabric softener, liquid containers that include a nozzle at an opening of a container body with an accommodation space for content liquid and a nozzle cap attached thereto are known (see, for example, Patent Literature (PTL) 1).

In such liquid containers, the nozzle is generally formed in the shape of a gutter, supported by a bulkhead of the nozzle cap, and disposed so that its tip protrudes outward from a tip opening of the nozzle cap. This allows the content liquid to be easily poured out through the nozzle to a targeted position.

CITATION LIST

Patent Literature

PTL 1: Japanese Patent No. 5094620

SUMMARY

Technical Problem

However, there is room for improvement in the above conventional liquid containers in that the nozzle cap, which is a separate component, is attached to the container body that contains the content liquid, which makes sorting and disposal complicated.

The disclosure aims to solve such a problem. It would be helpful to provide a liquid container and a liquid container with content liquid that are easy to sort and dispose of, while preventing dripping of the liquid from a nozzle to the outside.

Solution to Problem

To solve the above problem, a liquid container according to the disclosure is

[1]
a liquid container including:
a container body configured to compartmentally form an accommodation space for content liquid;

a tubular nozzle configured to be connected to an upper portion of the container body and guide the content liquid to the outside; and
a liquid recovery channel configured to return the content liquid on the radial outside of the nozzle into the accommodation space,
wherein the container body, the nozzle, and the liquid recovery channel are formed by integral molding.
According to the liquid container of the disclosure,
[2]
in the configuration described in above [1], the liquid recovery channel is preferably inclined downward toward a circumferential direction, and a connecting passage that connects the liquid recovery channel with the accommodation space is preferably provided at a lower end of the liquid recovery channel.
According to the liquid container of the disclosure,
[3]
in the configuration described in above [1] or [2], a bottom wall of the liquid recovery channel preferably has a thinned portion that is recessed upward from a lower surface of the bottom wall, and the thickness of the bottom wall at an area with the thinned portion is preferably substantially constant in a direction along the liquid recovery channel.
According to the liquid container of the disclosure,
[4]
in the configuration described in any of above [1] to [3], a bottom wall of the liquid recovery channel preferably has a thinned portion that is recessed upward from a lower surface of the bottom wall, and an area excluding the thinned portion in the lower surface of the bottom wall preferably extends horizontally over a circumferential direction.
According to the liquid container of the disclosure,
[5]
in the configuration described in any of above [1] to [4], an upper surface of a bottom wall of the liquid recovery channel is preferably inclined downward from the radial outside to the radial inside.
According to the liquid container of the disclosure,
[6]
in the configuration described in any of above [1] to [5], an outer tube is preferably formed on the radial outside of the nozzle, and the liquid recovery channel is preferably formed at a radial position between the nozzle and the outer tube.
According to the liquid container of the disclosure,
[7]
in the configuration described in above [1],
a pouring groove that is recessed radially outward and extends to an upper end of a tube wall of the nozzle is preferably provided at part of an inner peripheral surface of the tube wall of the nozzle in the circumferential direction, and
an outer peripheral surface of the tube wall of the nozzle is preferably located on a regular circle in plan view.
According to the liquid container of the disclosure,
[8]
in the configuration described in above [7], the amount of a radially outward recess of the pouring groove preferably increases, as well as the circumferential width of the pouring groove preferably increases, as the pouring groove nears the upper end.
According to the liquid container of the disclosure,
[9]
in the configuration described in above [1], the liquid container further includes a cap configured to cover the nozzle from above,

3 wherein
the cap preferably has a measuring tube in the shape of a
    cylinder with a top, and
when the cap is attached, the measuring tube is preferably
    disposed on the radial inside of the nozzle.
According to the liquid container of the disclosure,
[10]
in the configuration described in above [9], when the cap
is attached, a lower end of the measuring tube preferably
extends downward beyond the nozzle and is preferably
disposed inside the container body.
According to the liquid container of the disclosure,
[11]
in the configuration described in above [9] or [10],
the container body preferably includes a body portion
    configured to compartmentally form the accommoda-
    tion space for the content liquid, a bottom portion
    configured to close a lower end of the body portion, and
    a neck portion configured to be connected to an upper
    end of the body portion and have a reduced diameter
    than the body portion, and
the radial distance between an outer peripheral surface of
    the measuring tube and an inner peripheral surface of
    the neck portion is preferably 1 millimeter or more and
    3 millimeters or less.
According to the liquid container of the disclosure,
[12]
in the configuration described in any of above [9] to [11],
the cap preferably further includes an attachment tube
configured to be attached to an outer peripheral wall of the
liquid recovery channel, and the vertical distance from a
lower end of the attachment tube to a lower end of the
measuring tube is preferably greater than the vertical dis-
tance from an upper end of the outer peripheral wall of the
liquid recovery channel to an upper end of the nozzle.
According to the liquid container of the disclosure,
[13]
in the configuration described in any of above [9] or [12],
the radial width of the liquid recovery channel is preferably
3 millimeters or more.
A liquid container with content liquid according to the
disclosure is
[14]
a liquid container with content liquid including content
liquid contained in the accommodation space in the liquid
container described in above [10],
    wherein when the cap is attached, the lower end of the
    measuring tube is located, in the container body, inside
    a headspace in which no content liquid is contained.
According to the liquid container of the disclosure,
[15]
in the configuration described in above [1], the liquid
recovery channel is preferably configured to return the
content liquid on the radial outside of the nozzle into the
accommodation space through a notch provided at part of
the nozzle in a circumferential direction,
    the container body and the liquid recovery channel pref-
    erably have, at part in the circumferential direction, a
    vertical strip-shaped window portion through which the
    content liquid in the accommodation space is visible,
    and
    a circumferential position at which the notch is provided
    preferably contains a circumferential position at which
    the window portion is provided.

Advantageous Effect

According to the disclosure, it is possible to provide a
liquid container and a liquid container with content liquid that are easy to sort and dispose of, while preventing
dripping of the liquid from a nozzle to the outside.

BRIEF DESCRIPTION OF THE DRAWINGS

In the accompanying drawings:
FIG. 17 is a side view of a liquid container according to
a fourth embodiment of the disclosure.

DETAILED DESCRIPTION

Figure 1:
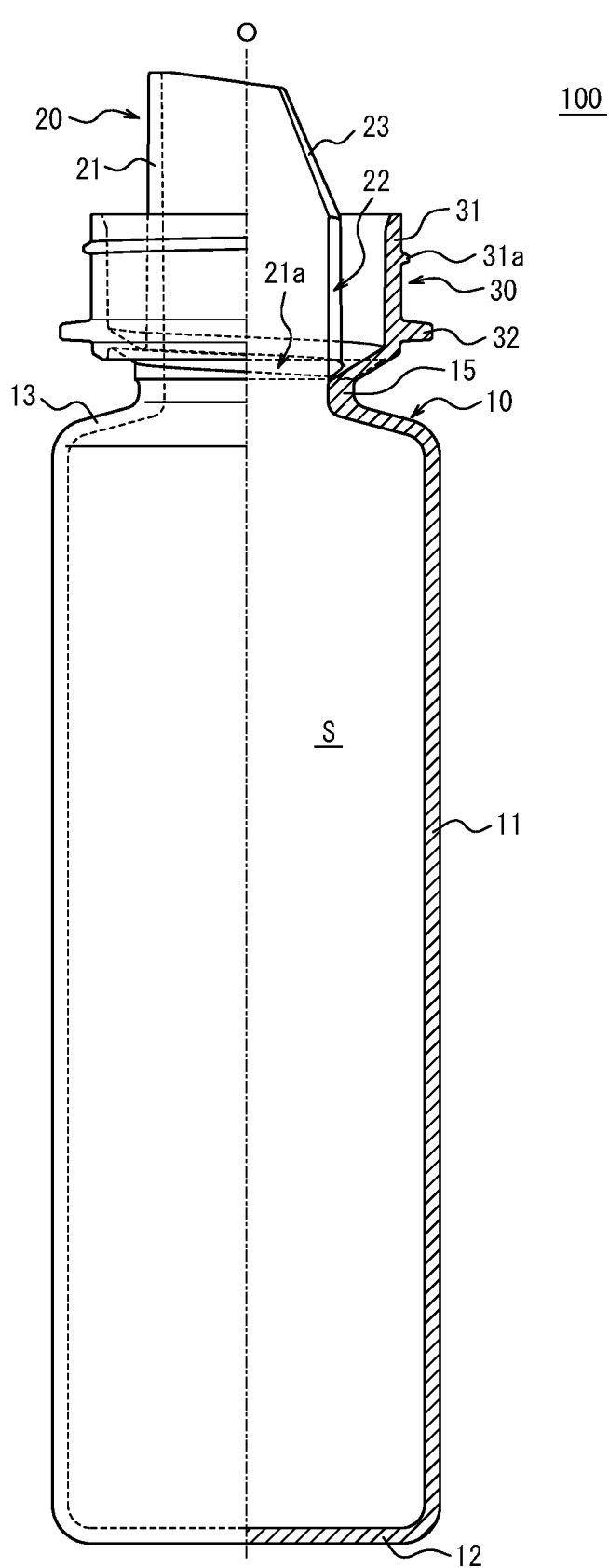
FIG. 1 is a front half cross-sectional view of a liquid
container according to a first embodiment of the disclosure.

The disclosure will be exemplarily described below in
more detail with reference to the drawings.
A liquid container 100 according to a first embodiment of
the disclosure illustrated in FIG. 1 is suitable for containing
content liquid with relatively high viscosity, such as, for
example, liquid laundry detergent or fabric softener, and has
a container body 10, a nozzle 20, and an outer tube 30. In
this specification, claims, abstract, and drawings, the side on
which the nozzle 20 is located is referred to as an upper side (upper side in FIG. 1), and the side on which a bottom portion 12 of the container body 10 is located is referred to as a lower side (lower side in FIG. 1). A radial outside is referred to as a direction away from the central axis O of the liquid container 100 extending in a vertical direction in FIG. 1, along a straight line that passes the central axis O and is perpendicular to the central axis O. A radial inside is referred to as a direction toward the central axis O along the straight line. The central axis O in FIG. 1 is used to define the radial outside and the radial inside, and does not mean that every component of the liquid container 100 in the present embodiment is always formed axisymmetrically around this central axis O.

In this specification, claims, abstract, and drawings, "integral molding" means one molded as a single piece with a die, including one molded as a single piece by insert molding, two-color molding, or the like, but does not include one that is made by integrating separate members molded with separate dies in a subsequent process that does not involve resin molding such as adhesion.

The container body 10 is formed in the shape of a bottle with a body portion 11 that compartmentally forms an accommodation space S for the content liquid inside, the bottom portion 12 that closes a lower end of the body portion 11, and a cylindrical opening portion 15 that is connected to an upper end of the body portion 11 via a shoulder portion 13, so that the content liquid (not illustrated) can be contained in the accommodation space S. The container body 10 can be made of synthetic resin, such as polyethylene (PE), polypropylene (PP), polystyrene (PS), or polyethylene terephthalate (PET). The opening portion 15 is not limited to a cylindrical shape, but can be formed in other shapes as long as the opening portion 15 is tubular, such as an oval tubular or square tubular.

Figure 3:
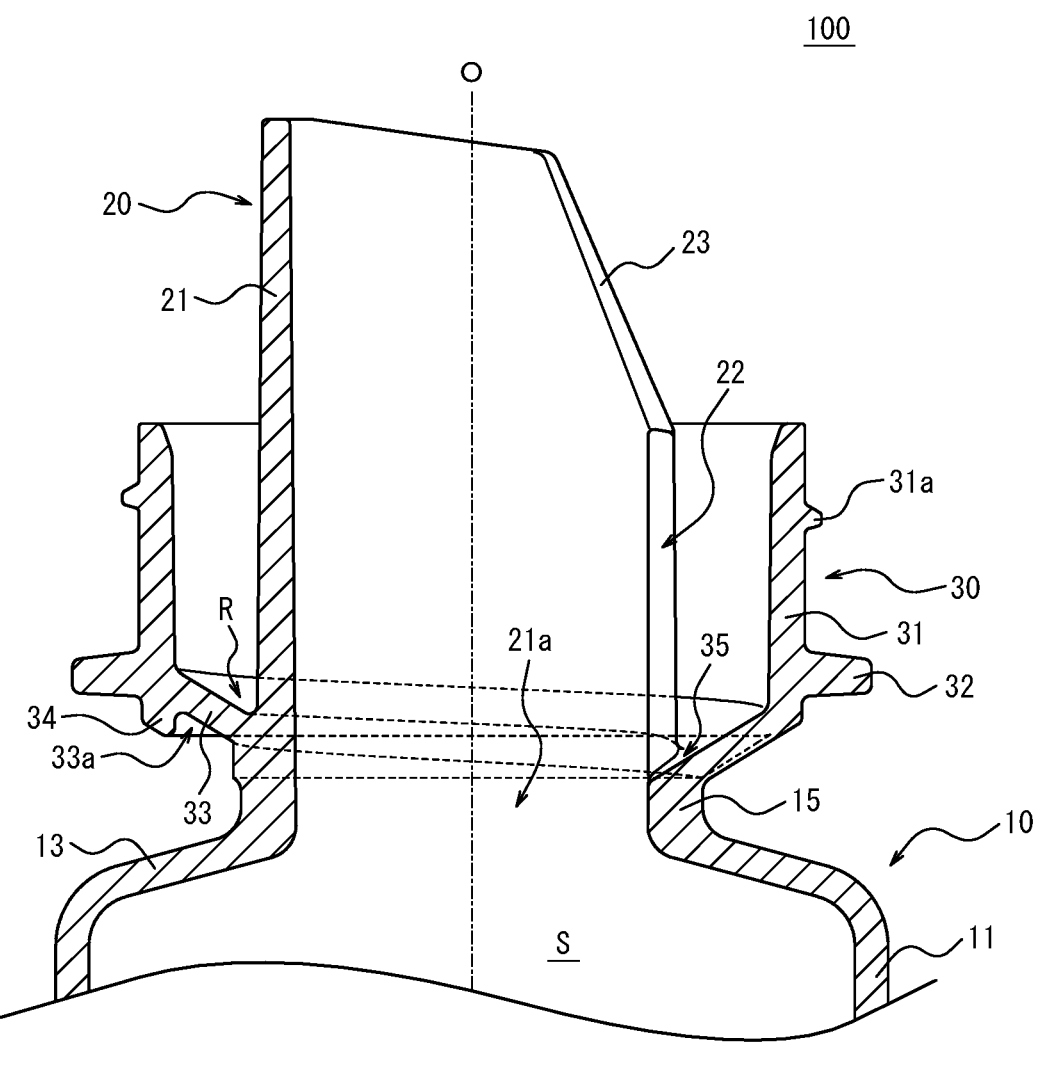
FIG. 3 is a cross-sectional view along the section A-A of
FIG. 2.

As illustrated in FIGS. 1 and 3, the nozzle 20 is integrally molded with the container body 10 so as to be connected to an upper end of the opening portion 15 of the container body 10. In the present embodiment, the nozzle 20 is formed in the shape of the letter C in cross section, i.e. the shape of a gutter, with a notch 22 extending from one end to the other end along an axial direction at one circumferential point of an approximately cylindrical tube wall 21, and a beveled portion 23 is formed at a circumferential edge forming the notch 22 at an upper portion of the tube wall 21. This configuration allows the content liquid contained in the accommodation space S of the container body 10 to be easily poured out at a desired position through the nozzle 20. The nozzle 20 protrudes upward from the upper end of the opening portion 15 and is formed of the same synthetic resin material as the container body 10.

A tip of the nozzle 20 is not limited to the shape with the inclined beveled portion 23, but can be of various shapes, such as a shape cut to be rounded when viewed from the side.

Figure 4:
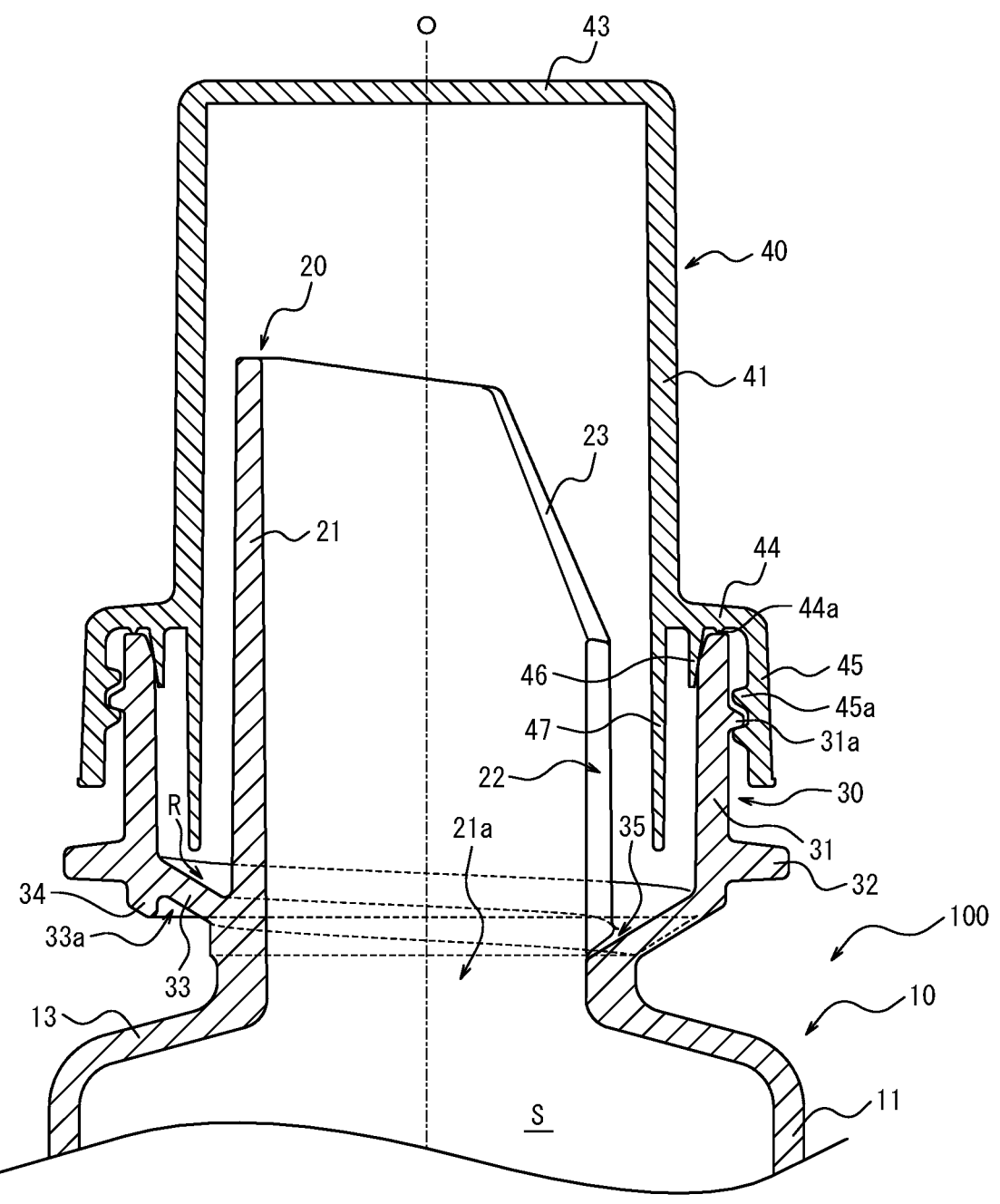
FIG. 4 is an enlarged front cross-sectional view illustrat-
ing a state in which a nozzle of FIG. 3 is covered with a cap.

An outer tube 30 to attach a cap 40 is provided on the radial outside of the nozzle 20 (see FIG. 4). As with the nozzle 20, the outer tube 30 is integrally molded with the container body 10 so as to be connected to the upper end of the opening portion 15 of the container body 10. The outer tube 30 includes an approximately cylindrical peripheral wall 31, an annular neck ring 32 protruding radially outward at a lower portion of the peripheral wall 31, and a bottom wall 33 inclined radially inward and downward from a lower end of the peripheral wall 31. An inner peripheral edge of the bottom wall 33 is connected to the upper end of the opening portion 15 of the container body 10. In the present embodiment, the container body 10, the nozzle 20, and the outer tube 30 are integrally molded of the same synthetic resin material.

In the present embodiment, the area enclosed by the tube wall 21 of the nozzle 20, the peripheral wall 31 of the outer tube 30, and the bottom wall 33 of the outer tube 30 functions as a liquid recovery channel R that returns the content liquid that has leaked to the radial outside of the nozzle 20 into the accommodation space S. In other words, the bottom wall 33 extending radially inward and downward from the lower end of the peripheral wall 31 of the outer tube 30 functions as a bottom wall 33 of the liquid recovery channel R.

Figure 2:
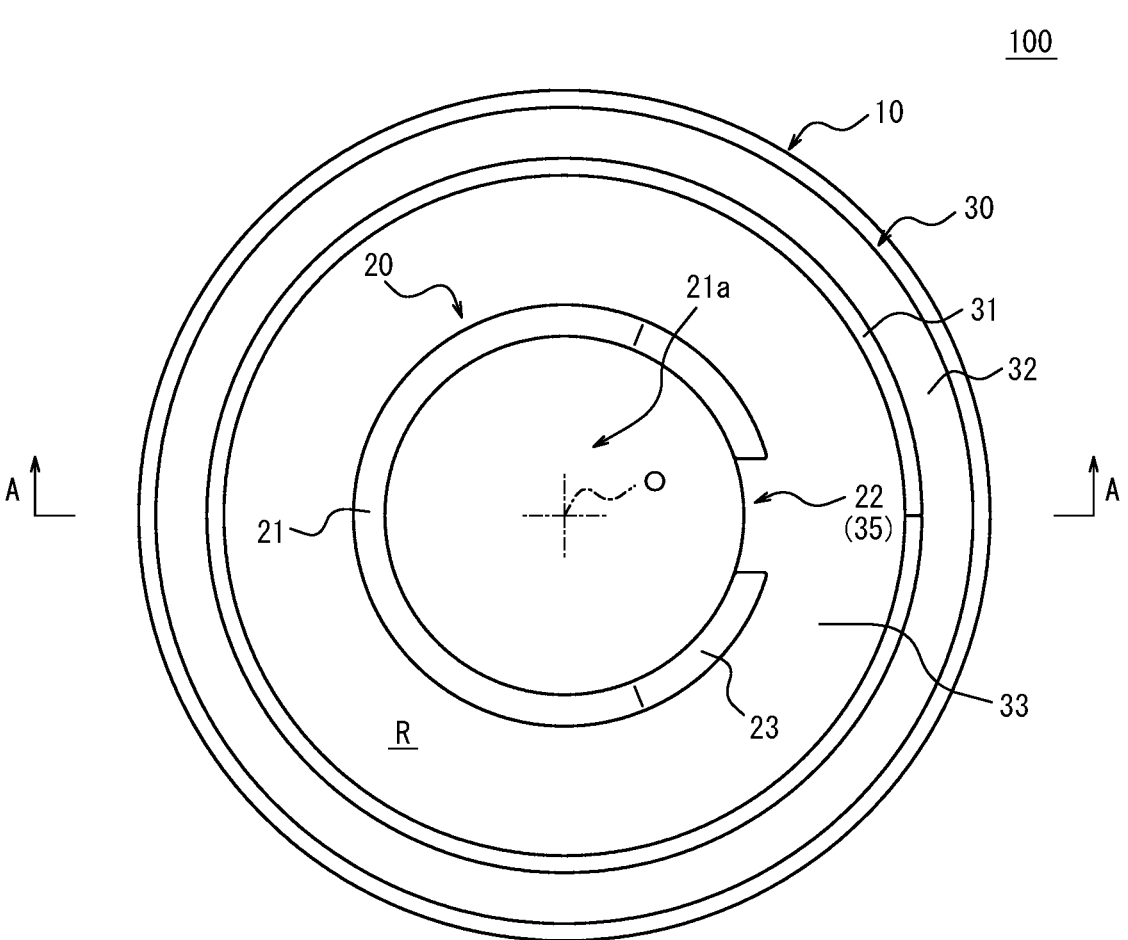
FIG. 2 is a plan view of the liquid container according to
the first embodiment of the disclosure.

An upper surface of the bottom wall 33 of the liquid recovery channel R is formed, in FIGS. 2 and 3, so that a left end is the highest and a right end, at which the notch 22 is provided, is the lowest. In other words, the bottom wall 33 is inclined downward from the left end to the right end so as to be gradually lower along the channel. In FIG. 2, the liquid recovery channel R has two paths, one from the left end to the right end clockwise along the channel and the other from the left end to the right end counterclockwise along the channel. In either path, the upper surface of the bottom wall 33 is inclined so as to be gradually lower from the left end to the right end. In other words, the upper surface of the bottom wall 33 of the liquid recovery channel R is formed spirally over a half-circumference from the left end to the right end. The bottom wall 33 is inclined downward from the radial outside to the radial inside at the same circumferential position. The upper surface of the bottom wall 33 gradually lowering from the left end to the right end in FIGS. 2 and 3 means that the upper surface of the bottom wall 33 gradually lowers from the left end to the right end at the same radial position (same widthwise position of the channel).

In the present embodiment, a lower end of the notch 22 provided at one circumferential point of the nozzle 20 constitutes a connecting passage 35 that connects the liquid recovery channel R with the accommodation space S. The content liquid that has leaked to the radial outside of the nozzle 20 enters the liquid recovery channel R and moves to a low direction from the left end to the right end of the bottom wall 33 in FIGS. 2 and 3. The content liquid that has moved within the liquid recovery channel R to the right end of the bottom wall 33 moves further radially inward, and is returned through the connecting passage 35 (see FIGS. 2 and 3) to the accommodation space S of the container body 10.

In the present embodiment, as illustrated in FIG. 3 and the like, the bottom wall 33 of the liquid recovery channel R is made thinner at an area excluding an outer edge portion 34 by providing a thinned portion 33a that is recessed upward from a lower surface of the bottom wall 33. The wall thickness of the bottom wall 33 at the area that is made thinner by wall-thinning is approximately constant in a direction along the channel. The thickness of the bottom wall 33 at the area that is made thinner by wall-thinning is also approximately constant in a radial direction. In other words, the thinned area in the bottom wall 33 of the liquid recovery channel R is, at the lower surface, as well as at the upper surface through which the content liquid flows, inclined downward from the left end to the right end of FIGS. 2 and 3 and downward radially inward.

As described above, by providing the thinned portion 33a in the bottom wall 33 of the liquid recovery channel R so that the thickness is configured to be made uniform at the thinned area especially in a circumferential direction, when a preform 200 (see FIG. 5) described below is integrally molded to manufacture the liquid container 100, a molten resin can easily flow evenly around an area corresponding to the bottom wall 133 in a die, which prevents the occurrence of a molding defect such as a sink mark. Note that, a configuration without providing the thinned portion 33a may be adopted. In the case of not providing the thinned portion 33a, for example, the lower surface of the bottom wall 33 may be configured to be tapered with approximately the same height in the circumferential direction, so that the thickness of the bottom wall 33 gradually becomes thinner in the circumferential direction.

In the present embodiment, a lower surface of the outer edge portion 34 of the bottom wall 33, which is not provided with the thinned portion 33a, is configured to extend approximately horizontally over the circumferential direction. In other words, the lower surface of the outer edge portion 34 is formed to be of almost the same height regardless of circumferential position. This configuration allows, for example, when forming the liquid container 100 by biaxial stretch blow molding of the preform 200 as described below, to mount the preform 200 on a blow molding die without tilting the preform 200, by butting and securing a lower end of the outer edge portion 34 of the bottom wall 33 against a reference plane of the blow molding die, without the need for precisely aligning the preform 200 with the blow molding die in the circumferential direction.

Instead of the outer edge portion 34 of the bottom wall 33, an upper or lower surface of the neck ring 32 may be butted against the reference plane of the blow molding die to secure the preform 200.

In the present embodiment, the bottom wall 33 is configured to be thinned at the area excluding the outer edge portion 34 and to be butted at the outer edge portion 34 against the reference plane of the blow molding die, but is not limited to this aspect. For example, the bottom wall 33 may be configured to be thinned at an area excluding an inner edge portion and to be butted at the inner edge portion against the reference plane of the dic.

An outer peripheral surface of an upper portion of the peripheral wall 31 of the outer tube 30 is provided with a male thread 31a for attaching the cap 40 described below by screw engagement. Instead of the male thread 31a, an annular protrusion may be provided on the peripheral wall 31 for attaching the cap 40 by stopper engagement.

As illustrated in FIG. 4, the cap 40 includes an outer peripheral wall 41 that covers the nozzle 20 from the radial outside, a top wall 43 that closes an upper end of the outer peripheral wall 41, a flange portion 44 that protrudes radially outward from a lower end of the outer peripheral wall 41, an attachment tube 45 that hangs down from an outer edge of the flange portion 44, a scaling wall 46 that hangs down from a lower surface of the flange portion 44 on the radial inside of the attachment tube 45 and contacts an inner surface of the peripheral wall 31 for sealing in a liquid-tight manner, and an inner tube 47 that hangs down from the lower surface of the flange portion 44 on the radial inside of the sealing wall 46.

In an inner surface of the attachment tube 45, a female thread 45a that is screwed into the male thread 31a formed in the peripheral wall 31 of the outer tube 30 is formed. As illustrated in FIG. 4, by screwing the female thread 45a of the cap 40 into the male thread 31a of the outer tube 30, making a sealing protrusion 44a on the lower end surface of the flange portion 44 in contact with an upper end surface of the peripheral wall 31, and making the sealing wall 46 in contact with the inner surface of the peripheral wall 31, a liquid-tight seal can be provided against the outside.

In the present embodiment, the cap 40 plays the role of preventing the content liquid from leaking out of a nozzle opening 21a, which is compartmentally formed by the nozzle 20. The cap 40 can also function as a measuring cap by attaching a scale for measuring, indicated by ribbed projections or printing, for example, on the outer peripheral wall 41. When the cap 40 is used as a measuring cap, for example, the cap 40 can be made of transparent or translucent resin to facilitate measuring the content liquid.

When the cap 40 is also used as a measuring cap, the liquid can be measured by using the cap 40 in a posture such that the top wall 43 of the cap 40, which is formed into a flat plate, is on a lower side and an opening of the cap 40 is on an upper side.

From a state illustrated in FIG. 4 in which the nozzle 20 is covered with the cap 40, the cap 40 is turned around the central axis O to release the screw engagement between the cap 40 and the outer tube 30 so that the cap 40 can be moved upward against the container body 10. The cap 40 can then be removed from the outer tube 30 by pulling the cap 40 upward with the screw engagement completely disengaged.

With the cap 40 removed from the outer tube 30 and the nozzle 20 exposed, the container body 10 can be tilted from an upright position with the tip of the nozzle 20 facing upward to an inclined position with the notch 22 facing upward, in order to pour the content liquid out of the accommodation space S through the nozzle opening 21a from the tip of the nozzle 20. At this time, the content liquid in the accommodation space S of the container body 10 is guided along the nozzle 20, which is formed in the shape of a gutter, and is poured out from the tip of the nozzle 20. When the container body 10 is returned to the upright position after pouring out the content liquid, even if the content liquid adhering to the tip of the nozzle 20 drips down along an outer peripheral surface of the nozzle 20, the content liquid does not drip down to the outside of the outer tube 30, but drips downward along the nozzle 20 and is received by the bottom wall 33 of the liquid recovery channel R. The content liquid that has dripped down into the liquid recovery channel R moves along the inclination of the upper surface of the bottom wall 33 and is returned to the accommodation space S of the container body 10 via the connecting passage 35. Therefore, this liquid container 100 can prevent dripping of the content liquid to the outside, while pouring out the content liquid from the nozzle 20.

After use, the nozzle 20 can be closed by attaching the cap 40 by screwing the female thread 45a of the cap 40 back into the male thread 31a of the outer tube 30.

Figure 5:
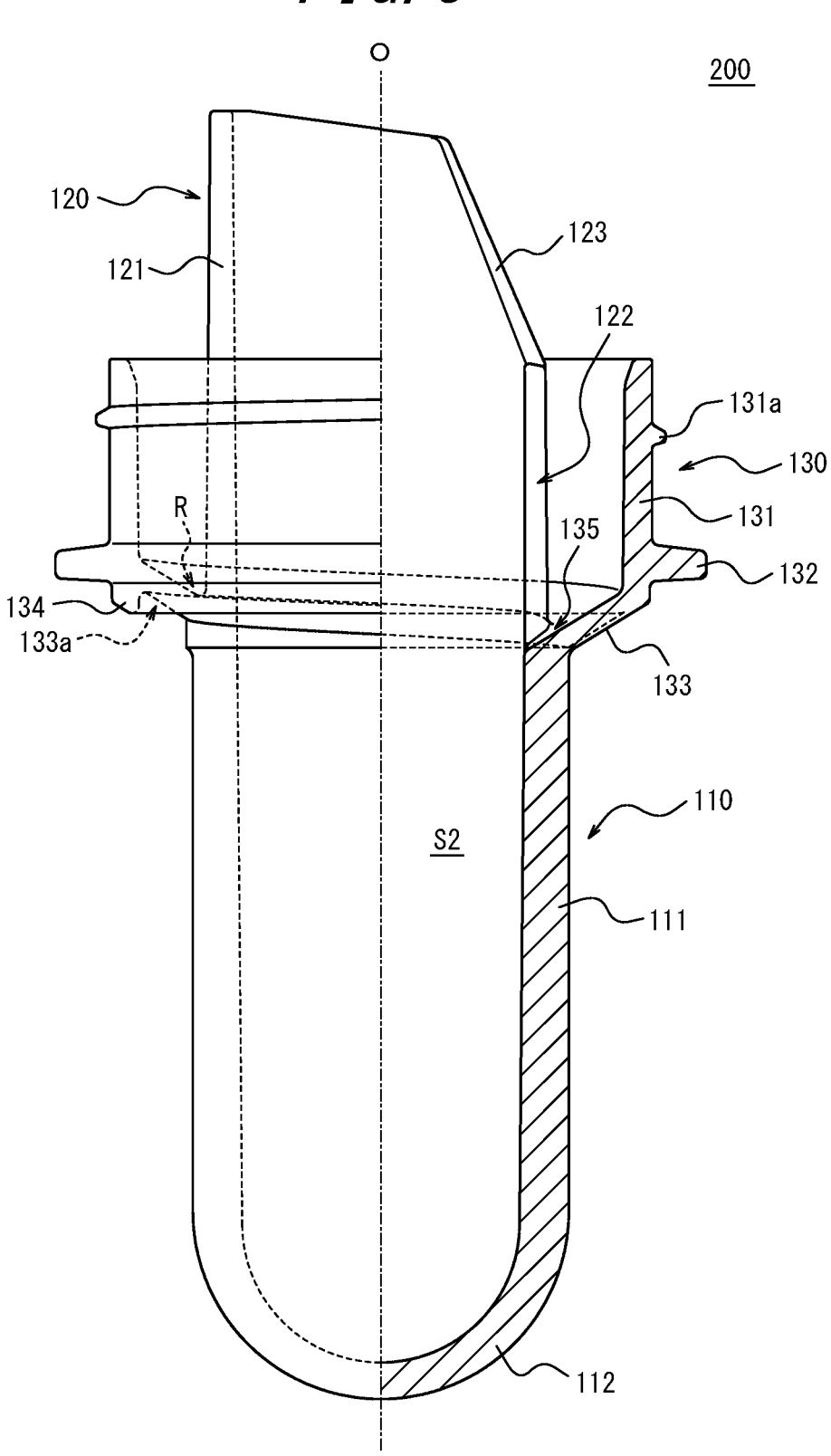
FIG. 5 is a front half cross-sectional view of a preform
used in the manufacture of the liquid container according to
the first embodiment of the disclosure.

To form the liquid container 100 according to the present embodiment, for example, the preform 200 illustrated in FIG. 5 is integrally molded by injection molding or the like. Then, an outer edge portion 134 of a bottom wall 133 of the liquid recovery channel R is butted against the reference plane of the blow molding die so as to secure the preform 200 to the die, and biaxial stretch blow molding is performed.

The preform 200 includes a main body 110 having the shape of a test tube, and a nozzle 120 and an outer tube 130 that are integrally molded at an upper end of the main body 110. The main body 110 includes a cylindrical body portion 111, and an approximately hemispherical bottom portion 112 that closes a lower end of the body portion 111. The main body 110 is a portion that forms the opening portion 15, the shoulder portion 13, the body portion 11, and the bottom portion 12 of the liquid container 100 by biaxial stretch blow molding of the preform 200, and has an interior space S2.

The nozzle 120 and the outer tube 130 of the preform 200 have the same shapes as the nozzle 20 and the outer tube 30 of the liquid container 100, and are parts that do not expand during biaxial stretch blow molding. As illustrated in FIG. 5, the nozzle 120 is formed in the shape of the letter C in cross section, i.e. the shape of a gutter, with a notch 122 extending from one end to the other end along an axial direction at one circumferential point of an approximately cylindrical tube wall 121, and a beveled portion 123 is formed at a circumferential edge forming the notch 122 at an upper portion of the tube wall 121.

The outer tube 130 of the preform 200 includes an approximately cylindrical peripheral wall 131, an annular neck ring 132 protruding radially outward at a lower portion of the peripheral wall 131, and a bottom wall 133 inclined radially inward and downward from a lower end of the peripheral wall 131. An inner peripheral edge of the bottom wall 133 is connected to an upper end of the main body 110.

In the present embodiment, the area enclosed by the tube wall 121 of the nozzle 120, the peripheral wall 131 of the outer tube 130, and the bottom wall 133 of the outer tube 130 forms the liquid recovery channel R. A thinned portion 133$a$ that is recessed upward is formed in a lower surface of the bottom wall 133, and an outer edge portion 134 of the bottom wall 133, which is not thinned, extends to approximately the same height in a circumferential direction.

When forming the liquid container 100 using the preform 200 illustrated in FIG. 5, the outer edge portion 134 of the bottom wall 133 of the preform 200 is butted against and secured to the reference plane of the blow molding die, and a pressurized fluid is supplied to the interior of the preform 200, while the main body 110 is stretched axially by a stretch rod, to perform biaxial stretch blow molding. In the present embodiment, only the main body 110 is axially and radially stretched by blow molding to form the liquid container 100 by forming the opening portion 15, the shoulder portion 13, the body portion 11, and the bottom portion 12 illustrated in FIG. 1. In this method of manufacturing the liquid container 100, the liquid container 100 in which the container body 10, the nozzle 20, and the outer tube 30 are integrally molded can be formed by expanding only the main body 110 of the preform 200, in which the main body 110, the nozzle 120, and the outer tube 130 are integrally molded, by biaxial stretch blow molding. Since the liquid recovery channel R is compartmentally formed by the nozzle 20 and the outer tube 30, the liquid container 100 is a container in which the container body 10, the nozzle 20, and the liquid recovery channel R are integrally molded.

As described above, in the present embodiment, the container body 10 that compartmentally forms the accommodation space S for the content liquid, the cylindrical nozzle 20 that is connected to an upper portion of the container body 10 and guides the content liquid to the outside, and the liquid recovery channel R that returns the content liquid on the radial outside of the nozzle 20 into the accommodation space S are configured to be formed by integral molding. By adopting such a configuration, it is possible to effectively prevent dripping of the content liquid to the outside, while pouring out the content liquid from the nozzle 20. In addition, since the container body 10, the nozzle 20, and the liquid recovery channel R are integrally molded, the amount of resin used can be reduced, and since there is no need to separate the nozzle cap from the container body, sort and disposal become casier.

In the present embodiment, the liquid recovery channel R is configured to be inclined downward toward the circumferential direction, and the connecting passage 35 that connects the liquid recovery channel R with the accommodation space S is configured to be provided at the lower end of the liquid recovery channel R. By adopting such a configuration, the content liquid that has leaked out of the nozzle 20 can be efficiently returned into the accommodation space S by using the inclined surface of the liquid recovery channel R.

In the present embodiment, the bottom wall 33 of the liquid recovery channel R is configured to have the thinned portion 33$a$ that is recessed upward from the lower surface of the bottom wall 33, and the thickness of the bottom wall 33 at the area with the thinned portion is configured to be approximately constant in the direction along the channel. By adopting such a configuration, when the preform 200 for manufacturing the liquid container 100 is integrally molded, the molten resin can easily flow evenly around the area corresponding to the bottom wall 133 in the die, thereby preventing the occurrence of a molding defect such as a sink mark.

In the present embodiment, the bottom wall 33 of the liquid recovery channel R is configured to have the thinned portion 33$a$ that is recessed upward from the lower surface of the bottom wall 33, and the area excluding the thinned portion 33$a$ in the lower surface of the bottom wall 33 is configured to extend horizontally over the circumferential direction. By adopting such a configuration, the preform 200 can be mounted on the blow molding die without tilting the preform 200, by butting and securing the area excluding the thinned portion 33$a$ of the bottom wall 33 against the reference plane of the blow molding die, without the need for precisely aligning the preform 200 with the blow molding die in the circumferential direction.

In the present embodiment, the upper surface of the bottom wall 33 of the liquid recovery channel R is configured to be inclined downward from the radial outside to the radial inside. By adopting such a configuration, the content liquid in the liquid recovery channel R can be collected to the radial inside, and the content liquid can be easily returned into the accommodation space S using the notch 22 of the nozzle 20, as the connecting passage 35.

In the present embodiment, the outer tube 30 is configured to be formed on the radial outside of the nozzle 20, and the liquid recovery channel R is configured to be formed at a radial position between the nozzle 20 and the outer tube 30. By adopting such a configuration, since a space between the outer tube 30, to which the cap 40 is attached to prevent leakage of the content liquid, and the nozzle 20 can be used as the liquid recovery channel R, it is possible to prevent leakage of the liquid from the liquid container 100 while maintaining a compact configuration.

Next, a liquid container 300 according to a second embodiment of the disclosure will be exemplarily described in more detail with reference to the drawings.

Figure 6:
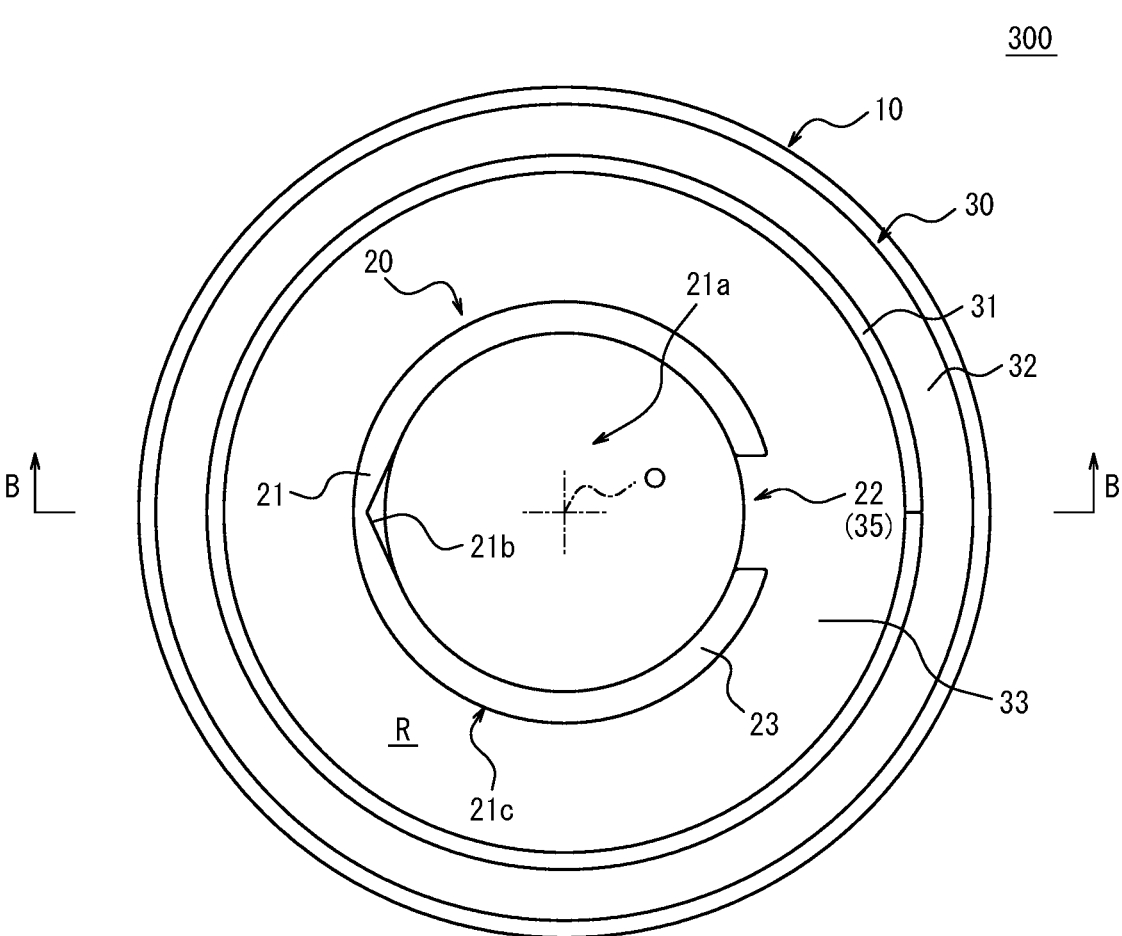
FIG. 6 is a plan view of a liquid container according to a
second embodiment of the disclosure.
Figure 7:
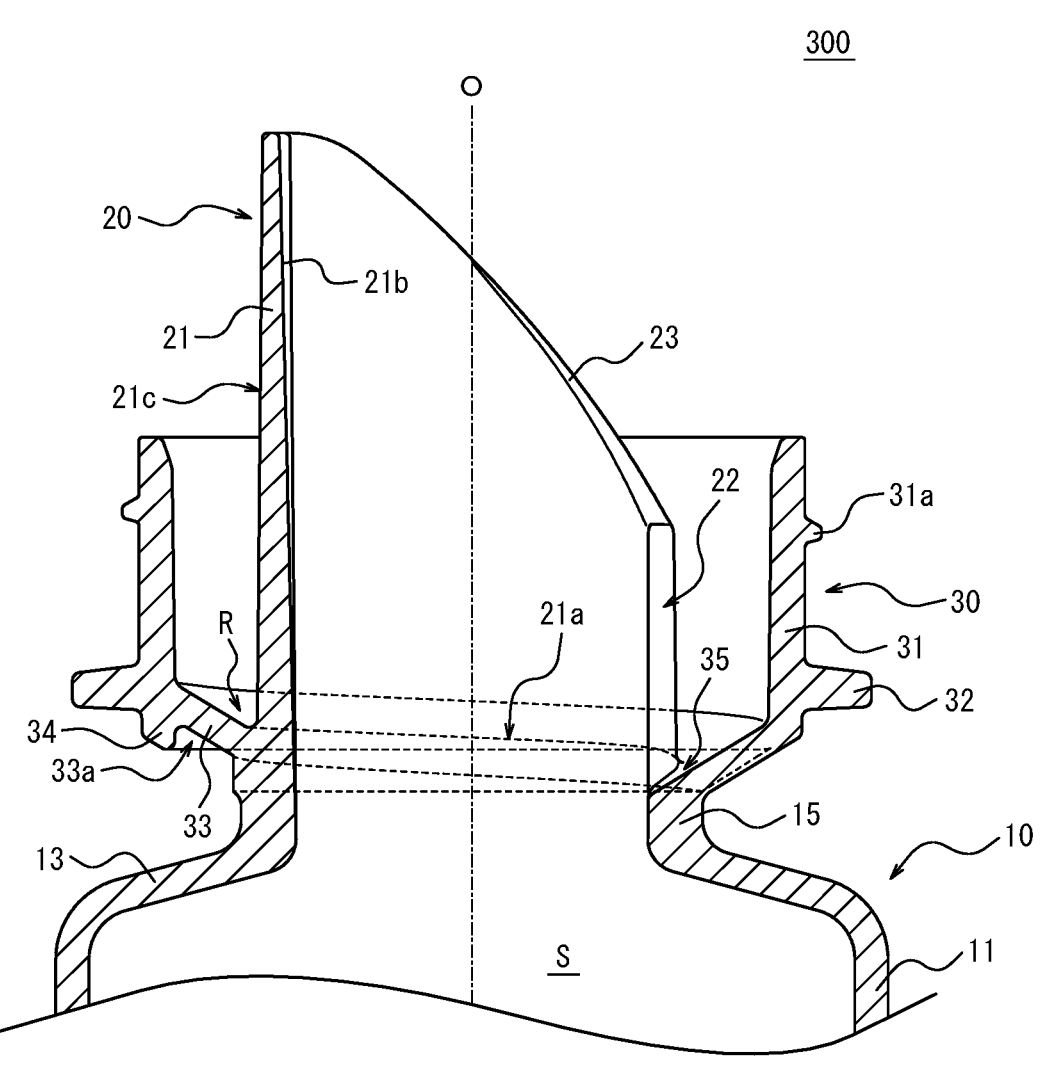
FIG. 7 is a cross-sectional view along the section B-B of
FIG. 6.

The liquid container 300 according to the second embodiment of the disclosure illustrated in FIGS. 6 and 7 has a container body 10, a nozzle 20, and an outer tube 30. The definitions of "vertical direction", "radial direction". "central axis", and "integrally molding" are the same as in the first embodiment, so further explanation here is omitted. In a description of an inclined posture of the liquid container 300, a side on which an upper end of the nozzle 20 is located may be described as a tip side. Since the configuration of the container body 10 is the same as in the first embodiment, an illustration of an entire diagram of the liquid container 300, including a bottom portion 12 of the container body 10, is omitted. Components that have the same functions as in the first embodiment will be described with the same reference signs as in the first embodiment.

As illustrated in FIG. 7, the nozzle 20 is integrally molded with the container body 10 so as to be connected to an upper end of an opening portion 15 of the container body 10. In the present embodiment, the nozzle 20 is formed in the shape of the letter C in cross section, i.e. the shape of a gutter, with a notch 22 extending from one end to the other end along an axial direction at one circumferential point of a cylindrical tube wall 21. At a circumferential edge forming the notch 22 at an upper portion of the tube wall 21, a beveled portion 23 that is cut to be rounded when viewed from the side is formed. This configuration allows content liquid contained in an accommodation space S of the container body 10 to be easily poured out at a desired position through the nozzle 20. The nozzle 20 protrudes upward from the upper end of the opening portion 15 and is formed of the same synthetic resin material as the container body 10.

In the present embodiment, as illustrated in FIG. 6, an outer peripheral surface 21c of the tube wall 21 is in the shape of an arc of a regular circle in plan view. In other words, although the tube wall 21 is not in the shape of a perfect regular circle in plan view due to the provision of the notch 22, the tube wall 21 is in the shape of an arc, which is part of a regular circle. The outer peripheral surface 21c of the tube wall 21 may constitute a complete regular circle in plan view without the notch 22. The outer peripheral surface 21c of the tube wall 21 may have the same diameter from the bottom to the top as illustrated in the example in FIG. 7, or may have a diameter that is reduced or expanded from the bottom to the top. With the above configuration, the outer peripheral surface 21c of the tube wall 21 is located on a regular circle at all areas in plan view. The outer peripheral surface 21c of the tube wall 21 refers to an outer surface that extends in a circumferential direction in the tube wall 21. In FIG. 6, radially extending surfaces that are formed by the provision of the notch 22 are not included in the outer peripheral surface 21c of the tube wall 21.

Conventional nozzles are configured so that the tip of the nozzle protrudes radially outward, allowing content liquid to be discharged at a desired position through the protruding portion. In the present embodiment, since the outer peripheral surface 21c of the nozzle 20 is configured to be located on a regular circle in plan view in order to increase the accuracy of the liquid container 300, so the conventional configuration cannot be adopted. Therefore, in order to discharge the content liquid from the nozzle 20 to a desired position, a pouring groove 21b that guides the content liquid to the desired position is provided at part of an inner peripheral surface of the tube wall 21 of the nozzle 20 in the circumferential direction.

As illustrated in FIGS. 6 and 7, the pouring groove 21b according to the present embodiment is provided at a circumferential position opposite the notch 22 in the inner peripheral surface of the tube wall 21 of the nozzle 20. The pouring groove 21b is recessed radially outward from the inner peripheral surface of the tube wall 21 as illustrated in FIGS. 6 and 7, and extends to an upper end (tip) of the tube wall 21 as illustrated in FIG. 7. In the present embodiment, the pouring groove 21b is configured so that the amount of a radially outward recess increases, as well as a circumferential width increases, as the pouring groove 21b nears the upper end. In other words, the pouring groove 21b is in the shape of an inverted triangular pyramid in which circumferential and radial widths increase as the pouring groove 21b nears the upper end. This configuration allows the content liquid that has been guided along the inner peripheral surface of the tube wall 21 to be gradually guided radially outward in the pouring groove 21b, thereby facilitating precisely discharging the liquid at the desired position. It can also provide good drainage when pouring out the content liquid.

The tip of the nozzle 20 is not limited to the beveled portion 23 that is cut to be rounded when viewed from the side, but can be of various shapes, such as straight inclined beveled portions.

On the radial outside of the nozzle 20, the outer tube 30 for attaching a cap 40 (see FIG. 8) is provided. As with the nozzle 20, the outer tube 30 is integrally molded with the container body 10 so as to be connected to the upper end of the opening portion 15 of the container body 10. The outer tube 30 includes an approximately cylindrical peripheral wall 31, an annular neck ring 32 protruding radially outward at a lower portion of the peripheral wall 31, and a bottom wall 33 inclined radially inward and downward from a lower end of the peripheral wall 31. An inner peripheral edge of the bottom wall 33 is connected to the upper end of the opening portion 15 of the container body 10. In the present embodiment, the container body 10, the nozzle 20, and the outer tube 30 are integrally molded of the same synthetic resin material.

In the present embodiment, the area enclosed by the tube wall 21 of the nozzle 20, the peripheral wall 31 of the outer tube 30, and the bottom wall 33 of the outer tube 30 functions as a liquid recovery channel R that returns the content liquid that has leaked to the radial outside of the nozzle 20 into the accommodation space S. In other words, the bottom wall 33 extending radially inward and downward from the lower end of the peripheral wall 31 of the outer tube 30 functions as a bottom wall 33 of the liquid recovery channel R.

The configuration of the liquid recovery channel R, the notch 22, the connecting passage 35, the thinned portion 33a, the peripheral wall 31, and the cap 40 is similar to that of the first embodiment, so a detailed description here is omitted.

Figure 8:
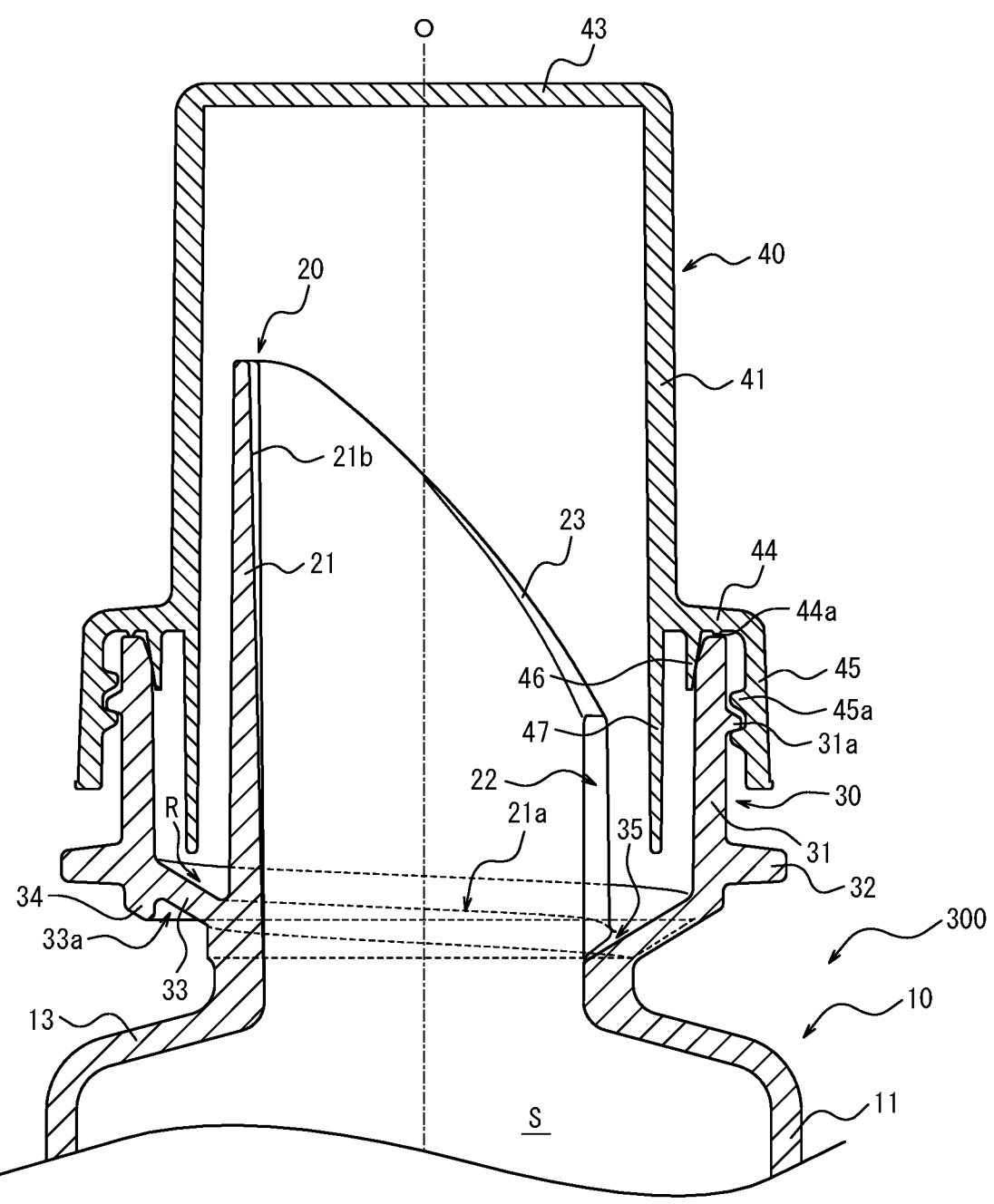
FIG. 8 is an enlarged front cross-sectional view illustrat-
ing a state in which a nozzle of FIG. 7 is covered with a cap.

From a state illustrated in FIG. 8 in which the nozzle 20 is covered with the cap 40, the cap 40 is turned around a central axis O to release the screw engagement between the cap 40 and the outer tube 30 so that the cap 40 can be moved upward against the container body 10. The cap 40 can then be removed from the outer tube 30 by pulling the cap 40 upward with the screw engagement completely disengaged.

With the cap 40 removed from the outer tube 30 and the nozzle 20 exposed, the container body 10 can be tilted from an upright position with the tip of the nozzle 20 facing upward to an inclined position with the notch 22 facing upward. This allows the pouring groove 21b to be oriented downward, so the content liquid in the accommodation space S can be guided into the tube wall 21 through the nozzle opening 21a, and then poured out through the pouring groove 21b provided on the tip side of the tube wall 21.

The pouring groove 21b according to the present embodiment is configured so that the amount of the radially outward recess increases, as well as the circumferential width increases, as the pouring groove 21b nears the tip side. This configuration allows the content liquid that has been guided along the inner peripheral surface of the tube wall 21 to be gradually guided radially outward in the pouring groove 21b, thereby facilitating precisely discharging the content liquid at a desired position. It can also provide good drainage when pouring out the content liquid.

When the container body 10 is returned to the upright position after pouring out the content liquid, even if the content liquid adhering to the tip of the nozzle 20 drips down along the outer peripheral surface 21c of the nozzle 20, the content liquid does not drip down to the outside of the outer tube 30, but drips downward along the nozzle 20 and is received by the bottom wall 33 of the liquid recovery channel R. The content liquid that has dripped down into the liquid recovery channel R moves along the inclination of the upper surface of the bottom wall 33 and is returned to the accommodation space S of the container body 10 via the connecting passage 35. Therefore, this liquid container 300 can prevent dripping of the content liquid to the outside, while pouring out the content liquid from the nozzle 20.

After use, the nozzle 20 can be closed by attaching the cap 40 by screwing a female thread 45*a* of the cap 40 back into a male thread 31*a* of the outer tube 30.

Figure 9:
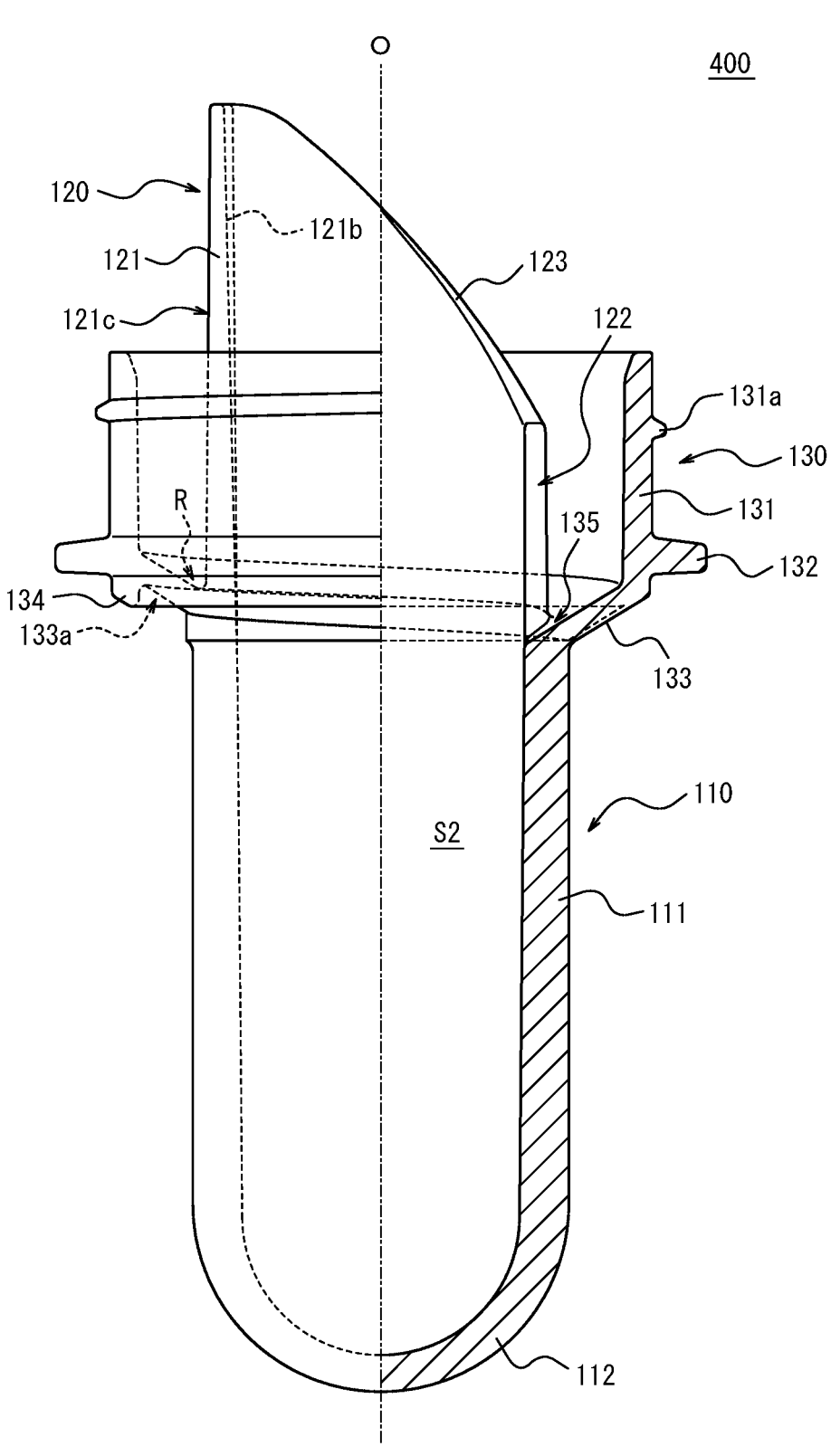
FIG. 9 is a front half cross-sectional view of a preform
used in the manufacture of the liquid container according to
the second embodiment of the disclosure.

To form the liquid container 300 according to the present embodiment, for example, a preform 400 illustrated in FIG. 9 is integrally molded by injection molding or the like. Then, an outer edge portion 134 of a bottom wall 133 of the liquid recovery channel R is butted against a reference plane of a blow molding die so as to secure the preform 400 to the die, and biaxial stretch blow molding is performed.

The preform 400 includes a main body 110 having the shape of a test tube, and a nozzle 120 and an outer tube 130 that are integrally molded at an upper end of the main body 110. The main body 110 includes a cylindrical body portion 111, and an approximately hemispherical bottom portion 112 that closes a lower end of the body portion 111. The main body 110 is a portion that forms the opening portion 15, a shoulder portion 13, a body portion 11, and the bottom portion 12 of the liquid container 300 by biaxial stretch blow molding of the preform 400, and has an interior space S2.

The nozzle 120 and the outer tube 130 of the preform 400 have the same shapes as the nozzle 20 and the outer tube 30 of the liquid container 300, and are parts that do not deform (expand) during biaxial stretch blow molding. As illustrated in FIG. 9, the nozzle 120 is formed in the shape of the letter C in cross section, i.e. the shape of a gutter, with a notch 122 extending from one end to the other end along an axial direction at one circumferential point of a cylindrical tube wall 121. A beveled portion 123 that is cut to be rounded when viewed from the side is formed at a circumferential edge forming the notch 122 at an upper portion of the tube wall 121.

In the present embodiment, an outer peripheral surface 121*c* of the tube wall 121 is in the shape of an arc of a regular circle in plan view. In other words, although the tube wall 121 is not in the shape of a perfect regular circle in plan view due to the provision of the notch 122, the tube wall 121 is in the shape of an arc, which is part of a regular circle. The outer peripheral surface 121*c* of the tube wall 121 may constitute a complete regular circle in plan view without the notch 122. With the above configuration, the outer peripheral surface 121*c* of the tube wall 121 is located on a regular circle at all areas in plan view. The outer peripheral surface 121*c* of the tube wall 121 refers to an outer surface that extends in a circumferential direction in the tube wall 121, and radially extending surfaces that are formed by the provision of the notch 122 are not included in the outer peripheral surface 121*c* of the tube wall 121. With this configuration, when the nozzle 120 and the main body 110 of the preform 400 are integrally molded with a die, a die part for molding the nozzle 120 and a die part for molding the main body 110 can both include a regular circular shape or an arc shape of a regular circle. Therefore, since matching surfaces of the die parts can be made into the shapes of regular circles, the molding accuracy of each die part can be increased, and eccentricity can be prevented due to increase in the alignment accuracy of the die part for molding the main body 110 with respect to the die part for molding the nozzle 120. Therefore, it is possible to prevent eccentricity of the container body 10 in the liquid container 300.

In the present embodiment, a pouring groove 121*b* that guides the content liquid to a desired position is provided in part of an inner peripheral surface of the tube wall 121 of the nozzle 120 in a circumferential direction.

As illustrated in FIG. 9, the pouring groove 121*b* according to the present embodiment is provided at a circumferential position opposite the notch 122 in the inner peripheral surface of the tube wall 121 of the nozzle 120. The pouring groove 121*b* is recessed radially outward from the inner peripheral surface of the tube wall 121 as illustrated in FIG. 9, and extends to an upper end of the tube wall 121. In the present embodiment, the pouring groove 121*b* is configured so that the amount of a radially outward recess increases, as well as a circumferential width increases, as the pouring groove 121*b* nears the upper end (tip). This configuration allows the content liquid that has been guided along the inner peripheral surface of the tube wall 21 of the liquid container 300 to be gradually guided radially outward in the pouring groove 21*b*, thereby facilitating precisely discharging the content liquid at a desired position. It can also provide good drainage when pouring out the content liquid.

The outer tube 130 of the preform 400 includes an approximately cylindrical peripheral wall 131, an annular neck ring 132 protruding radially outward at a lower portion of the peripheral wall 131, and a bottom wall 133 inclined radially inward and downward from a lower end of the peripheral wall 131. An inner peripheral edge of the bottom wall 133 is connected to an upper end of the main body 110.

In the present embodiment, the area enclosed by the tube wall 121 of the nozzle 120, the peripheral wall 131 of the outer tube 130, and the bottom wall 133 of the outer tube 130 forms the liquid recovery channel R. A thinned portion 133*a* that is recessed upward is formed in a lower surface of the bottom wall 133, and an outer edge portion 134 of the bottom wall 133, which is not thinned, extends to approximately the same height in the circumferential direction.

When forming the liquid container 300 using the preform 400 illustrated in FIG. 9, the outer edge portion 134 of the bottom wall 133 of the preform 400 is butted against and secured to the reference plane of the blow molding die, and a pressurized fluid is supplied to the interior of the preform 400, while the main body 110 is stretched axially by a stretch rod, to perform biaxial stretch blow molding. In the present embodiment, only the main body 110 is axially and radially stretched by blow molding to form the liquid container 300 by forming the opening portion 15, the shoulder portion 13, and the body portion 11 illustrated in FIG. 7, and the not-illustrated bottom portion.

In this method of manufacturing the liquid container 300, the liquid container 300 in which the container body 10, the nozzle 20, and the outer tube 30 are integrally molded can be formed by expanding only the main body 110 of the preform 400, in which the main body 110, the nozzle 120, and the outer tube 130 are integrally molded, by biaxial stretch blow molding. Since the liquid recovery channel R is compartmentally formed by the nozzle 20 and the outer tube 30, the liquid container 300 is a container in which the container body 10, the nozzle 20, and the liquid recovery channel R are integrally molded.

As described above, the present embodiment is the liquid container 300 including the container body 10 that compartmentally forms the accommodation space S for the content liquid, the cylindrical nozzle 20 that is connected to an upper portion of the container body 10 and guides the content liquid to the outside, and the liquid recovery channel R that returns the content liquid on the radial outside of the nozzle 20 into the accommodation space S. The container body 10, the nozzle 20, and the liquid recovery channel R are formed by integral molding. At part of the inner peripheral surface of the tube wall 21 of the nozzle 20 in the circumferential direction, the pouring groove 21b that is recessed radially outward and extends to the upper end of the tube wall 21 is provided. The outer peripheral surface 21c of the tube wall 21 of the nozzle 20 is configured to be located on a regular circle in plan view. By adopting such a configuration, it is possible to effectively prevent dripping of the content liquid to the outside, while pouring out the content liquid from the nozzle 20. In addition, since the container body 10, the nozzle 20, and the liquid recovery channel R are integrally molded, the amount of resin used can be reduced, and since there is no need to separate the nozzle cap from the container body, sort and disposal become easier.

The term "sort and disposal become easier" here means that the nozzle cap and the container body can be disposed of together, eliminating the need to separate the nozzle cap from the container.

In particular, in the present embodiment, the outer peripheral surface 21c of the tube wall 21 is located on a regular circle in plan view. By adopting such a configuration, when the nozzle 120 and the main body 110 (see FIG. 9) of the preform 400, which is a precursor of the liquid container 300, are integrally molded with a die, a die part for molding the nozzle 120 and a die part for molding the main body 110 can both include a regular circular shape or an arc shape of a regular circle. Therefore, since matching surfaces of the die parts can be made into the shapes of regular circles, the molding accuracy of each die part can be increased, and eccentricity can be prevented due to increase in the alignment accuracy of the die part for molding the main body 110 with respect to the die part for molding the nozzle 120. Therefore, it is possible to prevent eccentricity of the container body 10 in the liquid container 300.

Furthermore, in the present embodiment, the pouring groove 21b is provided at the circumferential position opposite the notch 22 in the inner peripheral surface of the tube wall 21 of the nozzle 20, so the content liquid that has been guided along the inner peripheral surface of the tube wall 21 can be collected into the pouring groove 21b, thus facilitating accurately discharging the content liquid to a desired position. It can also provide good drainage when pouring out the content liquid.

In the present embodiment, the pouring groove 21b is configured so that the amount of the radially outward recess increases, as well as the circumferential width increases, as the pouring groove 21b nears the upper end. By adopting such a configuration, the content liquid that has been guided along the inner peripheral surface of the tube wall 21 can be gradually guided radially outward in the pouring groove 21b, thereby facilitating precisely discharging the content liquid at a desired position. It can also provide good drainage when pouring out the content liquid.

Next, a liquid container 500 according to a third embodiment of the disclosure, will be exemplarily described in more detail with reference to the drawings.

Figure 10:
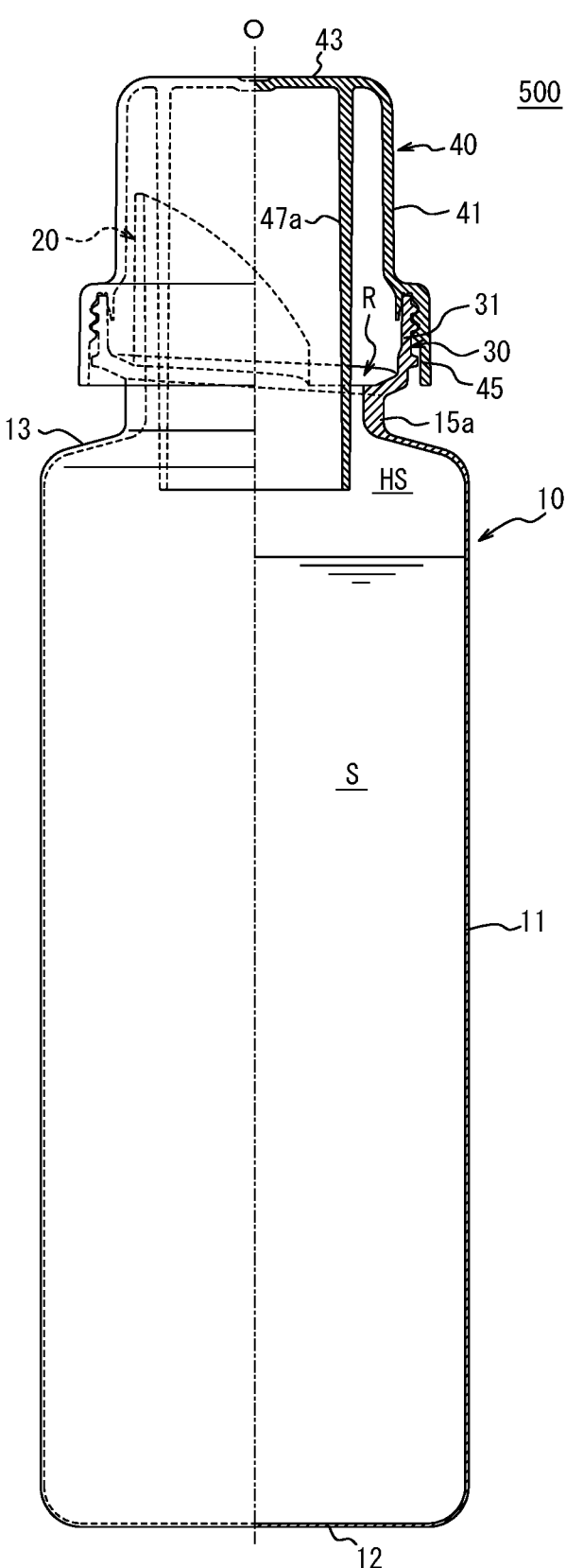
FIG. 10 is a front half cross-sectional view of a liquid
container with content liquid according to a third embodi-
ment of the disclosure.
Figure 12:
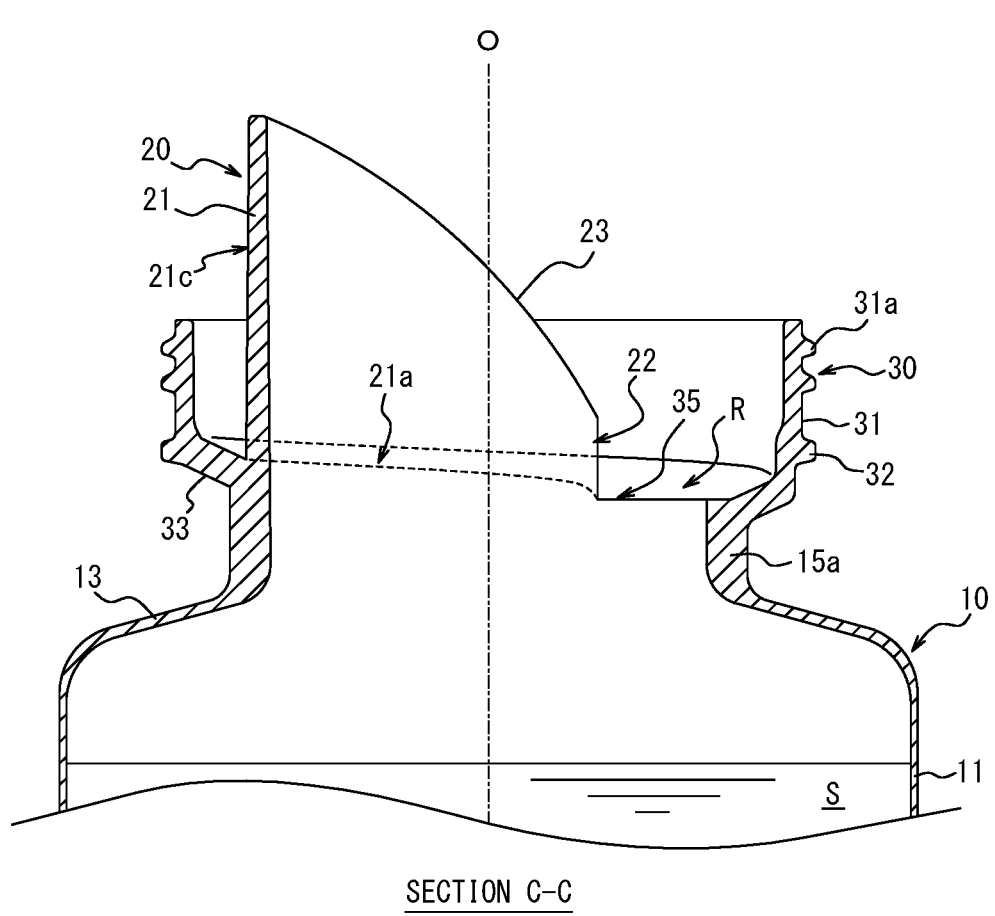
FIG. 12 is a cross-sectional view along the section C-C of
FIG. 11.
Figure 13:
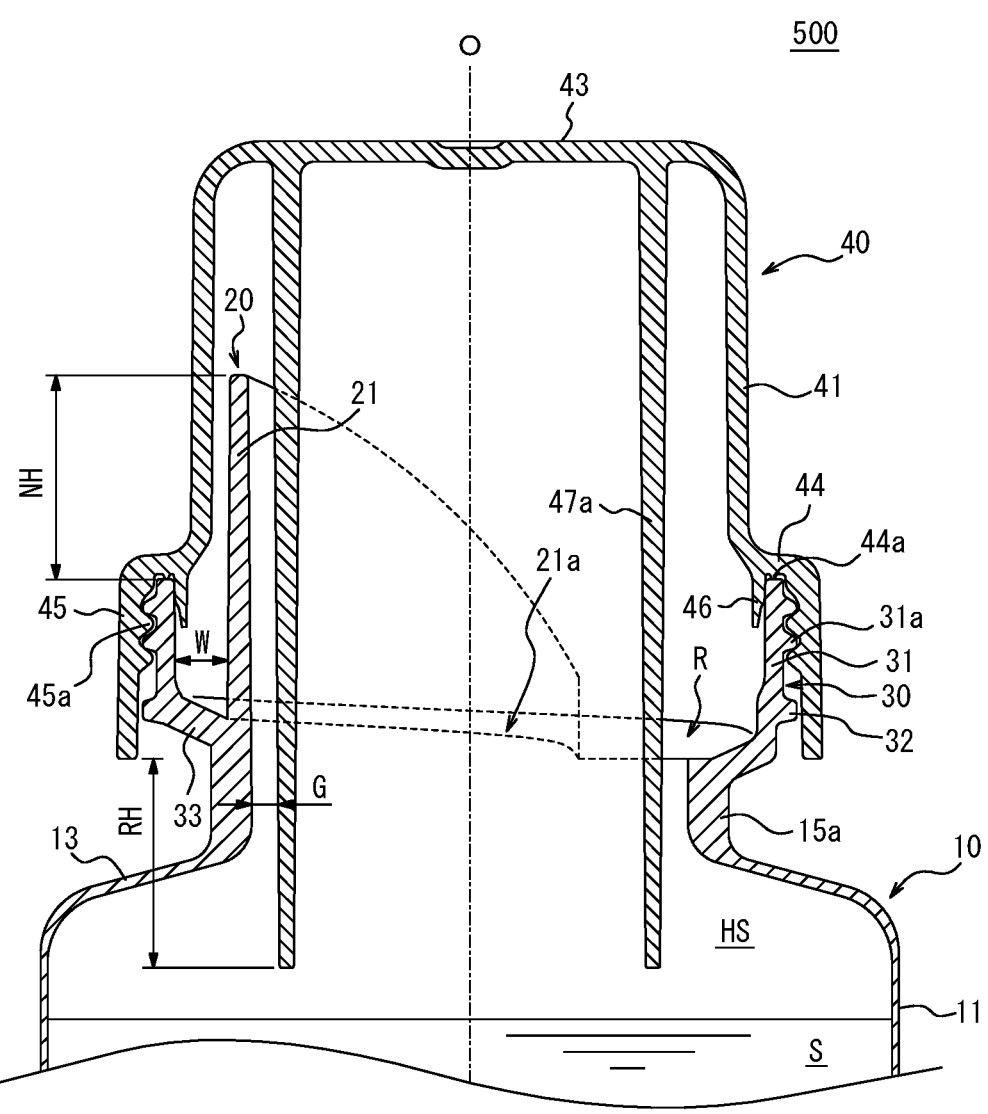
FIG. 13 is an enlarged front cross-sectional view of the
nozzle, the liquid recovery channel, and a cap in FIG. 10.

The liquid container 500 according to the third embodiment of the disclosure illustrated in FIG. 10 has a container body 10, a nozzle 20, an outer tube 30, and a cap 40. The definitions of "vertical direction", "radial direction", "central axis", and "integrally molding" are the same as in the first embodiment, so further explanation here is omitted. Components that have the same functions as in the first embodiment will be described with the same reference signs as in the first embodiment. In a description of an inclined posture of the liquid container 500, a side on which an upper end of the nozzle 20 is located may be described as a tip side. In addition, in a description of a state of detaching the cap 40, a lower end of a measuring tube 47a of the cap 40 may be described as a tip. FIGS. 10, 12, and 13 illustrate a state in which an accommodation space S of the container body 10 is filled with content liquid.

The container body 10 is formed in the shape of a bottle with a body portion 11 that compartmentally forms the accommodation space S for the content liquid inside, a bottom portion 12 that closes a lower end of the body portion 11, and a cylindrical neck portion 15a that is connected to an upper end of the body portion 11 via a shoulder portion 13, so that the content liquid (not illustrated) can be contained in the accommodation space S. The container body 10 can be made of synthetic resin, such as polyethylene (PE), polypropylene (PP), polystyrene (PS), or polyethylene terephthalate (PET).

Figure 11:
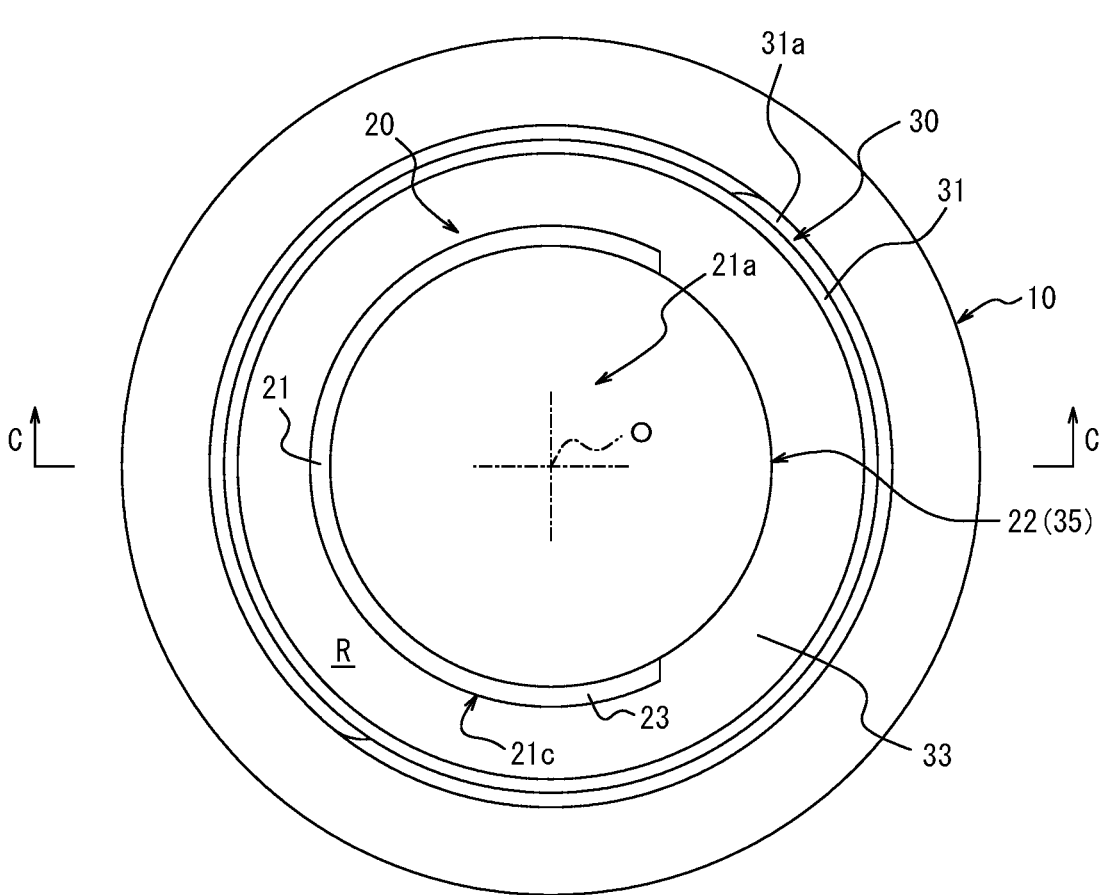
FIG. 11 is a plan view of a container body, a nozzle, and
a liquid recovery channel that constitute the liquid container
according to the third embodiment of the disclosure.

As illustrated in FIG. 12, the nozzle 20 is integrally molded with the container body 10 so as to be connected to an upper end of the neck portion 15a of the container body 10. In the present embodiment, as illustrated in FIGS. 11 and 12, the nozzle 20 is formed in the shape of the letter C in cross section, i.e. the shape of a gutter, with a notch 22 extending from one end to the other end along an axial direction at one circumferential point of a cylindrical tube wall 21. At a circumferential edge forming the notch 22 at an upper portion of the tube wall 21, a beveled portion 23 that is cut to be rounded when viewed from the side is formed. This configuration allows the content liquid contained in the accommodation space S of the container body 10 to be easily poured out at a desired position through the nozzle 20. The nozzle 20 protrudes upward from the upper end of the neck portion 15a and is formed of the same synthetic resin material as the container body 10.

In the present embodiment, as illustrated in FIG. 11, an outer peripheral surface 21c of the tube wall 21 is in the shape of an arc of a regular circle in plan view. In other words, although the tube wall 21 is not in the shape of a perfect regular circle in plan view due to the provision of the notch 22, the tube wall 21 is in the shape of an arc, which is part of a regular circle. The outer peripheral surface 21c of the tube wall 21 may have the same diameter from the bottom to the top as illustrated in the example in FIG. 12, or may have a diameter that is reduced or expanded from the bottom to the top. The outer peripheral surface 21c of the tube wall 21 is not necessarily in the shape of an arc of a regular circular.

A pouring groove that guides the content liquid to a desired position may be provided at part of the inner peripheral surface of the tube wall 21 in a circumferential direction.

A tip of the nozzle 20 is not limited to the beveled portion 23 that is cut to be rounded when viewed from the side, but can be of various shapes, such as straight inclined beveled portions.

On the radial outside of the nozzle 20, the outer tube 30 for attaching the cap 40 (see FIG. 13) is provided. As with the nozzle 20, the outer tube 30 is integrally molded with the container body 10 so as to be connected to the upper end of the neck portion 15a of the container body 10. The outer tube 30 includes a cylindrical peripheral wall (outer peripheral wall) 31, an annular neck ring 32 protruding radially outward at a lower portion of the peripheral wall 31, and a bottom wall 33 inclined radially inward and downward from a lower end of the peripheral wall 31. An inner peripheral edge of the bottom wall 33 is connected to the upper end of the neck portion 15a of the container body 10. In the present embodiment, the container body 10, the nozzle 20, and the outer tube 30 (including the peripheral wall 31 and the bottom wall 33) are integrally molded of the same synthetic resin material.

In the present embodiment, the area enclosed by the tube wall 21 of the nozzle 20, the peripheral wall 31 of the outer tube 30, and the bottom wall 33 of the outer tube 30 functions as a liquid recovery channel R that returns the content liquid that has leaked to the radial outside of the nozzle 20 into the accommodation space S. In other words, the bottom wall 33 extending radially inward and downward from the lower end of the peripheral wall 31 of the outer tube 30 functions as a bottom wall 33 of the liquid recovery channel R. and the peripheral wall 31 of the outer tube 30 functions as an outer peripheral wall of the liquid recovery channel R.

The configuration of the liquid recovery channel R, the notch 22, a connecting passage 35, the peripheral wall 31, and the cap 40 is similar to that of the first embodiment, although there are some portions with slightly different shapes, so a detailed description here is omitted.

In the present embodiment, as illustrated in FIG. 12 and the like, a lower surface of the bottom wall 33 of the liquid recovery channel R is provided approximately in parallel with an upper surface of the bottom wall 33 so as to have a constant thickness. By configuring the thickness of the bottom wall 33 of the liquid recovery channel R to be uniform, especially in the circumferential direction, when a preform 600 (see FIG. 14), which is described below, for manufacturing the liquid container 500 is integrally molded, molten resin can easily flow evenly around an arca corresponding to the bottom wall 133 in a die, thereby preventing the occurrence of a molding defect such as a sink mark. However, the disclosure is not limited to this aspect. For example, when at least part of the lower surface of the bottom wall 33 is configured to be of approximately the same height horizontally and the liquid container 500 is formed by biaxial stretch blow molding of the preform 600 (FIG. 14) as described below, the preform 600 can be mounted on a blow molding die without tilting the preform 600, by butting and securing a horizontal plane of the lower surface of the bottom wall 133 against a reference plane of the blow molding die, without the need for precisely aligning the preform 600 with the blow molding die in the circumferential direction.

As illustrated in FIG. 13, the cap 40 includes an outer peripheral wall 41 that covers the nozzle 20 from the radial outside, a top wall 43 that closes an upper end of the outer peripheral wall 41, a flange portion 44 that protrudes radially outward from a lower end of the outer peripheral wall 41, an attachment tube 45 that hangs down from an outer edge of the flange portion 44, a sealing wall 46 that hangs down from a lower surface of the flange portion 44 on the radial inside of the attachment tube 45 and contacts an inner surface of the peripheral wall 31 for sealing in a liquid-tight manner, and a measuring tube 47a that hangs down from the radial inside of the outer peripheral wall 41 in the top wall 43.

In an inner surface of the attachment tube 45, a female thread 45a that is screwed into a male thread 31a formed in the peripheral wall 31 of the outer tube 30 is formed. As illustrated in FIG. 13, by screwing the female thread 45a of the cap 40 into the male thread 31a of the outer tube 30, making a sealing protrusion 44a on the lower surface of the flange portion 44 in contact with an upper end surface of the peripheral wall 31, and making the sealing wall 46 in contact with the inner surface of the peripheral wall 31, a liquid-tight seal can be provided against the outside.

In the present embodiment, the cap 40 plays the role of preventing the content liquid from leaking out of a nozzle opening 21a, which is compartmentally formed by the nozzle 20, but can also function as a measuring cap by attaching a scale for measuring, indicated by ribbed projections or printing, for example, on the measuring tube 47a. When the cap 40 is used as a measuring cap, for example, the cap 40 can be made of transparent or translucent resin to facilitate measuring the content liquid.

When the cap 40 is also used as a measuring cap, the content liquid can be poured into the measuring tube 47a and measured with the cap 40 in a posture such that the top wall 43 of the cap 40, which is formed into a flat plate, is on a lower side and the lower end (tip) of the measuring tube 47a is on an upper side.

In the present embodiment, as illustrated in FIG. 13, when the attachment tube 45 of the cap 40 is attached to the peripheral wall 31 of the outer tube 30, the measuring tube 47a in the shape of a cylinder with a top is disposed on the radial inside of the nozzle 20. At this time, the lower end (tip) of the measuring tube 47a extends downward beyond a lower end of the nozzle 20, enters into the interior of the container body 10. In FIG. 13, the accommodation space S of the body portion 11 of the container body 10 is filled with the content liquid, and the lower end of the measuring tube 47a extends to an area of a headspace HS, which is not filled with the content liquid. The headspace HS is a space above a liquid level and below the upper end of the neck portion 15a when the accommodation space S is filled with the maximum amount of the content liquid, as illustrated in FIG. 10. The volume of the headspace HS varies depending on the shape of the liquid container 500, the type of the content liquid, and the like, but is generally on the order of 10% to 40% of the accommodation space S. However, the percentage of the headspace HS to the accommodation space S is not limited to the range described above.

In the present embodiment, as described above, the measuring tube 47a is configured to be disposed on the radial inside of the nozzle 20. With this configuration, even if a vertical distance RH (see FIG. 13) between the lower end (tip) of the measuring tube 47a and a lower end of the attachment tube 45 is lengthened in order to improve the case of pouring and the avoidance of dripping when the content liquid is poured out from the measuring tube 47a (case of pouring when the content liquid is poured from the tip of the measuring tube 47a while avoiding adhesion of the content liquid to the attachment tube 45), the lower end of the measuring tube 47a only penetrates deeply into the body portion 11 of the container body 10 and does not interfere with other components. Therefore, the vertical distance RH between the lower end of the measuring tube 47a and the lower end of the attachment tube 45 can be determined in consideration of the case of use for users, without increasing the overall length of the liquid container 500.

In the present embodiment, the vertical distance RH described above is approximately 15.4 millimeters, which is longer than a vertical distance NH (approximately 15.0 millimeters) between an upper end of the peripheral wall 31 and the upper end of the nozzle 20 in FIG. 13. Here, the vertical distance NH between the upper end of the peripheral wall 31 and the upper end of the nozzle 20 is an index length for the case of pouring and the avoidance of dripping when the content liquid is poured out from the nozzle 20. Thus, by making the vertical distance RH between the lower end of the measuring tube 47a and the lower end of the attachment tube 45 longer than the vertical distance NH between the upper end of the peripheral wall 31 and the upper end of the nozzle 20, the ease of pouring and the avoidance of dripping can be improved not only when the content liquid is poured out from the nozzle 20, but also when the content liquid is poured out from the measuring tube 47a of the cap 40.

In the present embodiment, the lower end of the measuring tube 47a extends downward beyond the lower end of the nozzle 20, but only to the area (see FIG. 13) of the headspace HS, which is not filled with the content liquid. Therefore, it is possible to prevent the content liquid from adhering to the lower end of the measuring tube 47a when the liquid container 500 is stored. Therefore, when the content liquid is measured with the cap 40 in a posture such that the top wall 43 of the cap 40 is on the lower side and the lower end (tip) of the measuring tube 47a is on the upper side, no content liquid is on the tip of the measuring tube 47a, so it is possible to prevent the content liquid from leaking out of the measuring tube 47a.

In the present embodiment, a gap G (see FIG. 13) between an outer peripheral surface of the measuring tube 47a and an inner peripheral surface of the neck portion 15a is configured to be 1 millimeter or more and 3 millimeters or less. By setting the gap G to 1 millimeter or more, the liquid can be smoothly recovered through the gap G. Also, by setting the gap G to 3 millimeters or less, the width of the liquid recovery channel R and the inner diameter of the measuring tube 47a can be easily secured sufficiently. In other words, when the width of the liquid recovery channel R is not changed, the inner diameter of the measuring tube 47a can be easily secured large enough. When the inner diameter of the measuring tube 47a is not changed, the width of the liquid recovery channel R can be secured large enough.

In the present embodiment, the lower end (tip) of the measuring tube 47a is configured to be of approximately the same height over the circumferential direction, but it is not limited to this aspect. The lower end of the measuring tube 47a may be configured with a beveled portion, as in the nozzle 20, so that metered content liquid can be easily poured out through the measuring tube 47a to a desired position.

In the present embodiment, the radial width of the liquid recovery channel R is configured to be 3 millimeters or more. With this configuration, the content liquid that has leaked out of the nozzle 20 can be recovered into the liquid recovery channel R, without leaking to the outside of the peripheral wall 31.

From a state illustrated in FIG. 13 in which the nozzle 20 is covered with the cap 40, the cap 40 is turned around a central axis O to release the screw engagement between the cap 40 and the outer tube 30 so that the cap 40 can be moved upward against the container body 10. The cap 40 can then be removed from the outer tube 30 by pulling the cap 40 upward with the screw engagement completely disengaged.

With the cap 40 removed from the outer tube 30 and the nozzle 20 exposed, the container body 10 is tilted from an upright position with the tip of the nozzle 20 facing upward to an inclined position with the notch 22 facing upward. Thereby, the content liquid in the accommodation space S can be guided into the tube wall 21 through the nozzle opening 21a and poured out.

When the container body 10 is returned to the upright position after pouring out the content liquid, even if the content liquid adhering to the tip of the nozzle 20 drips down along the outer peripheral surface 21c of the nozzle 20, the content liquid does not drip down to the outside of the outer tube 30, but drips downward along the nozzle 20 and is received by the bottom wall 33 of the liquid recovery channel R. The content liquid that has dripped down into the liquid recovery channel R moves along the inclination of the upper surface of the bottom wall 33 and is returned to the accommodation space S of the container body 10 via the connecting passage 35. Therefore, this liquid container 500 can prevent dripping of the content liquid to the outside, while pouring out the content liquid from the nozzle 20.

After use, the nozzle 20 can be closed by attaching the cap 40 by screwing a female thread 45a of the cap 40 back into a male thread 31a of the outer tube 30.

Figure 14:
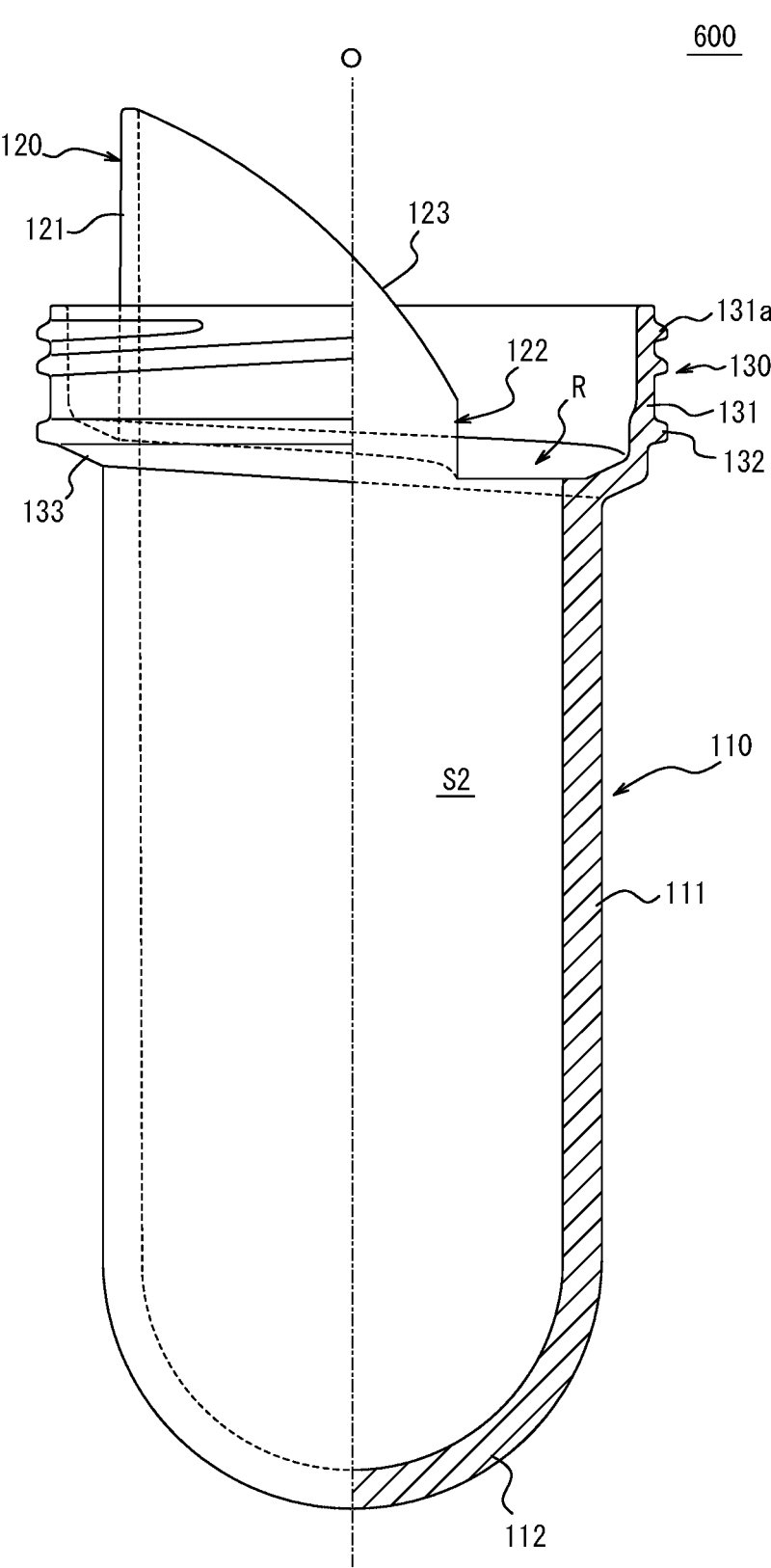
FIG. 14 is a front half cross-sectional view of a preform
used in the manufacture of the liquid container according to
the third embodiment of the disclosure.

To form the container body 10, the nozzle 20, and the liquid recovery channel R of the liquid container 500 according to the present embodiment, for example, a preform 600 illustrated in FIG. 14 is integrally molded by injection molding or the like. Then, a reference plane provided in a neck ring 132 or the like of the preform 600 is butted against a reference plane of a blow molding die so as to secure the preform 600 to the die, and biaxial stretch blow molding is performed.

The preform 600 includes a main body 110 having the shape of a test tube, and a nozzle 120 and an outer tube 130 that are integrally molded at an upper end of the main body 110. The main body 110 includes a cylindrical body portion 111, and an approximately hemispherical bottom portion 112 that closes a lower end of the body portion 111. The main body 110 is a portion that forms the neck portion 15a, the shoulder portion 13, the body portion 11, and the bottom portion 12 of the liquid container 500 by biaxial stretch blow molding of the preform 600, and has an interior space S2.

The nozzle 120 and the outer tube 130 of the preform 600 have the same shapes as the nozzle 20 and the outer tube 30 of the liquid container 500, and are parts that do not deform (expand) during biaxial stretch blow molding. As illustrated in FIG. 14, the nozzle 120 is formed in the shape of the letter C in cross section, i.e. the shape of a gutter, with a notch 122 extending from one end to the other end along an axial direction at one circumferential point of a cylindrical tube wall 121. A beveled portion 123 that is cut to be rounded when viewed from the side is formed at a circumferential edge forming the notch 122 at an upper portion of the tube wall 121.

The outer tube 130 of the preform 600 includes an approximately cylindrical peripheral wall 131, an annular neck ring 132 protruding radially outward at a lower portion of the peripheral wall 131, and a bottom wall 133 inclined radially inward and downward from a lower end of the peripheral wall 131. An inner peripheral edge of the bottom wall 133 is connected to an upper end of the main body 110.

In the present embodiment, the area enclosed by the tube wall 121 of the nozzle 120, the peripheral wall 131 of the outer tube 130, and the bottom wall 133 of the outer tube 130 forms the liquid recovery channel R.

When forming the liquid container 500 using the preform 600 illustrated in FIG. 14, the reference plane such as the neck ring 132 of the preform 600 is butted against and secured to the reference plane of the blow molding die, and a pressurized fluid is supplied to the interior of the preform 600, while the main body 110 is stretched axially by a stretch rod, to perform biaxial stretch blow molding. In the present embodiment, only the main body 110 is axially and radially stretched by blow molding to form the liquid container 500 by forming the neck portion 15a, the shoulder portion 13, the body portion 11, and the bottom portion 12 illustrated in FIG. 10.

In this method of manufacturing the liquid container 500, the liquid container 500 in which the container body 10, the nozzle 20, and the outer tube 30 (including the peripheral wall 31 and the bottom wall 33) are integrally molded can be formed by expanding only the main body 110 of the preform 600, in which the main body 110, the nozzle 120, and the outer tube 130 (including the peripheral wall 131 and the bottom wall 133) are integrally molded, by biaxial stretch blow molding. Since the liquid recovery channel R is compartmentally formed by the nozzle 20 and the outer tube 30, the liquid container 500 is a container in which the container body 10, the nozzle 20, and the liquid recovery channel R are integrally molded.

As described above, the present embodiment is the liquid container 500 including the container body 10 that compartmentally forms the accommodation space S for the content liquid, the cylindrical nozzle 20 that is connected to an upper portion of the container body 10 and guides the content liquid to the outside, the liquid recovery channel R that returns the content liquid on the radial outside of the nozzle 20 into the accommodation space S, and the cap 40 that covers the nozzle 20 from above. The container body 10, the nozzle 20, and the liquid recovery channel R are formed by integral molding. The cap 40 has the measuring tube 47a in the shape of a cylinder with a top. When the cap 40 is attached, the measuring tube 47a is configured to be disposed on the radial inside of the nozzle 20. By adopting such a configuration, it is possible to effectively prevent dripping of the content liquid to the outside, while pouring out the content liquid from the nozzle 20.

In addition, since the container body 10, the nozzle 20, and the liquid recovery channel R are integrally molded, the amount of resin used can be reduced, and since there is no need to separate the nozzle cap from the container body, sort and disposal become easier.

The term "sort and disposal become easier" here is used as the same meaning as in the second embodiment.

In particular, in the present embodiment, since the measuring tube 47a is disposed on the radial inside of the nozzle 20, even if the vertical distance RH (see FIG. 13) between the lower end of the measuring tube 47a and the lower end of the attachment tube 45 is lengthened in order to improve the case of pouring and the avoidance of dripping, there is no interference with other components, such as the liquid recovery channel R. Therefore, it is possible to improve the case of pouring the content liquid and the avoidance of dripping, by determining the vertical distance RH between the lower end of the measuring tube 47a and the lower end of the attachment tube 45 in consideration of the case of use for users, without increasing the overall length of the liquid container 500. By increasing the axial length of the measuring tube 47a, the volume of the measuring tube 47a can be secured while maintaining the slim shape without enlarging the liquid container 500 in the radial direction.

In the present embodiment, when the cap 40 is attached, the lower end of the measuring tube 47a is configured to extend downward beyond the nozzle 20 and be disposed inside the container body 10. By adopting such a configuration, the vertical length of the measuring tube 47a can be extended beyond the vertical distance between the top wall 43 and the bottom wall 33 of the liquid recovery channel R. Therefore, the case of pouring the content liquid and the avoidance of dripping can be further improved.

In the present embodiment, the container body 10 has the body portion 11 that compartmentally forms the accommodation space S for the content liquid, the bottom portion 12 that closes the lower end of the body portion 11, and the neck portion 15a that is connected to the upper end of the body portion 11 and has a reduced diameter than the body portion 11. The radial distance (gap G in FIG. 13) between the outer peripheral surface of the measuring tube 47a and the inner peripheral surface of the neck portion 15a is configured to be 1 millimeter or more and 3 millimeters or less. By adopting such a configuration, setting the gap G to 1 millimeter or more allows smooth recovery of the content liquid through the gap G. Also, setting the gap G to 3 millimeters or less facilitates sufficiently securing the width of the liquid recovery channel R and the inner diameter of the measuring tube 47a.

In the present embodiment, the cap 40 further has the attachment tube 45 that is attached to the outer peripheral wall (peripheral wall 31) of the liquid recovery channel R. The vertical distance from the lower end of the attachment tube 45 to the lower end of the measuring tube 47a is configured to be greater than the vertical distance from the upper end of the outer peripheral wall of the liquid recovery channel R to the upper end of the nozzle 20. By adopting such a configuration, the case of pouring and the avoidance of dripping can be improved not only when the content liquid is poured out from the nozzle 20, but also when the content liquid is poured out from the measuring tube 47a of the cap 40.

In the present embodiment, the radial width of the liquid recovery channel R is configured to be 3 millimeters or more. By adopting such a configuration, the content liquid that has leaked out of the nozzle 20 can be contained in the liquid recovery channel R, without leaking to the outside of the peripheral wall 31.

In the present embodiment, the liquid container 500 is a liquid container with content liquid contained in the accommodation space S. When the cap 40 is attached, the lower end of the measuring tube 47a is configured to be located, in the container body 10, inside the headspace HS in which no content liquid is contained. By adopting such a configuration, when the liquid container 500 is stored with the cap 40 attached, the content liquid does not adhere to the lower end of the measuring tube 47a. Therefore, when the content liquid is measured with the cap 40 in a posture such that the top wall 43 of the cap 40 is on the lower side and the lower end (tip) of the measuring tube 47a is on the upper side, no content liquid is on the tip of the measuring tube 47a, so it is possible to prevent the content liquid from leaking out of the measuring tube 47a.

Next, a liquid container 700 according to a fourth embodiment of the disclosure will be exemplarily described in more detail with reference to the drawings.

Figure 15:
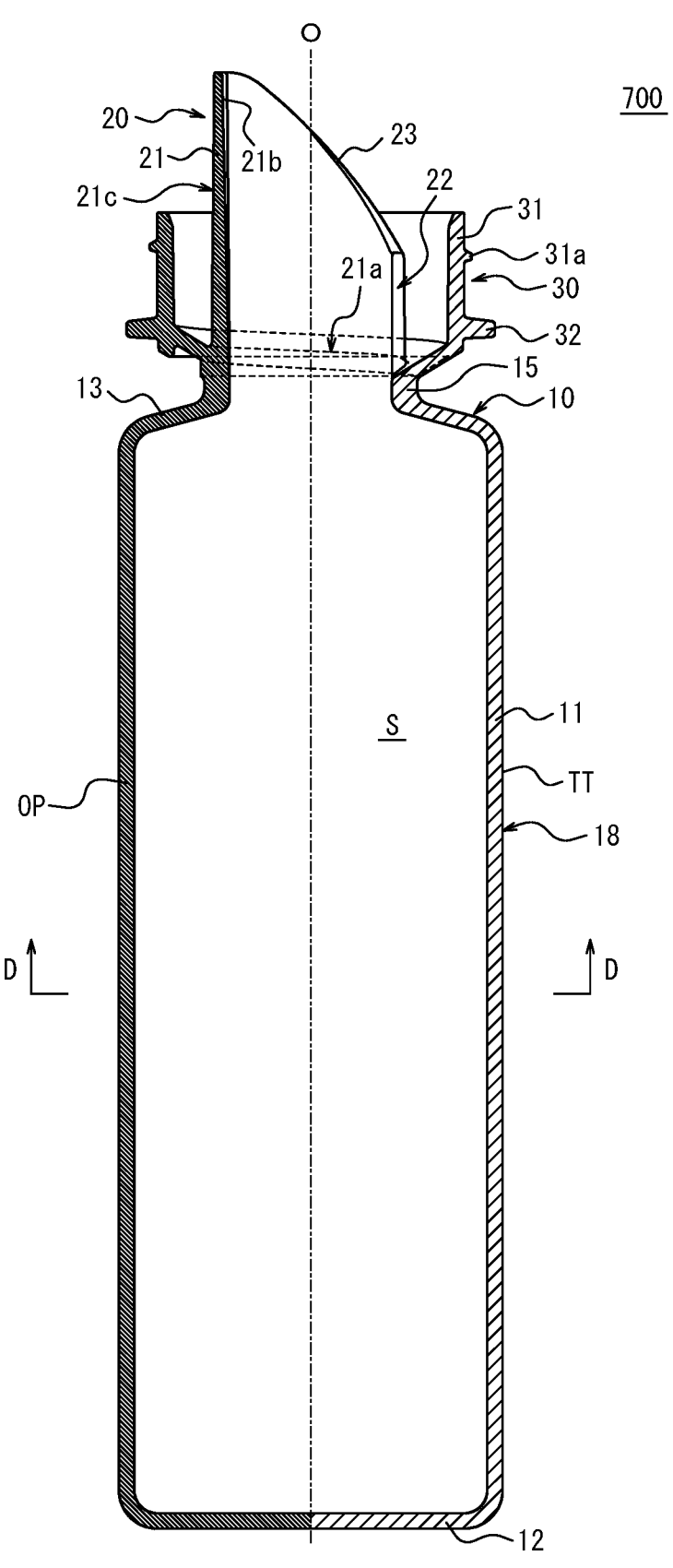
FIG. 15 is a front cross-sectional view of a liquid con-
tainer according to a fourth embodiment of the disclosure.

The liquid container 700 according to the fourth embodiment of the disclosure illustrated in FIG. 15 has a container body 10, a nozzle 20, and an outer tube 30. The definitions of "vertical direction", "radial direction", "central axis", and "integrally molding" are the same as in the first embodiment, so further explanation here is omitted. Components that have the same functions as in the first embodiment will be described with the same reference signs as in the first embodiment. In a description of an inclined posture of the liquid container 700, a side on which the nozzle 20 is located may be described as a tip side.

The container body 10 is formed in the shape of a bottle with a body portion 11 that compartmentally forms an accommodation space S for content liquid inside, a bottom portion 12 that closes a lower end of the body portion 11, and a cylindrical opening portion 15 that is connected to an upper end of the body portion 11 via a shoulder portion 13, so that the content liquid (not illustrated) can be contained in the accommodation space S.

Figure 16A:
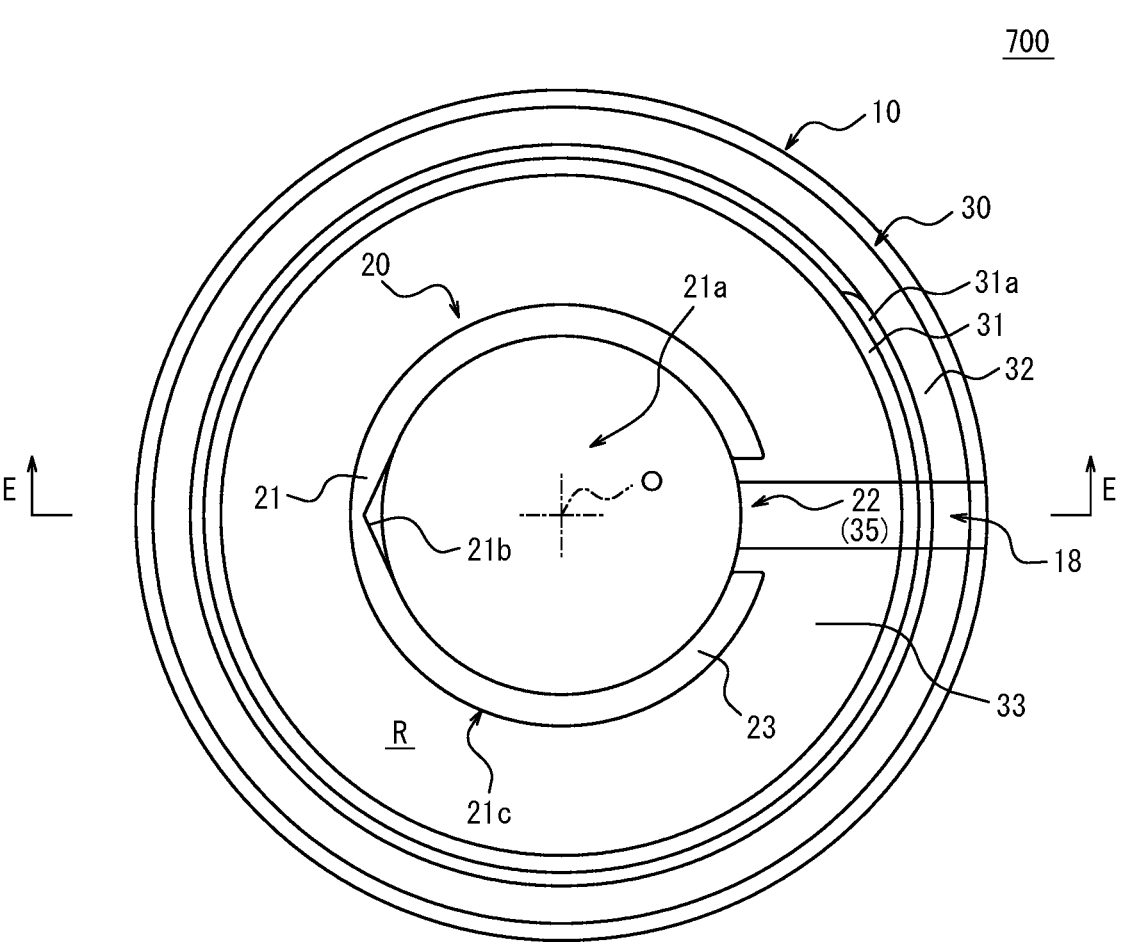
FIG. 16A is a plan view of the liquid container according
to the fourth embodiment of the disclosure.
Figure 16B:
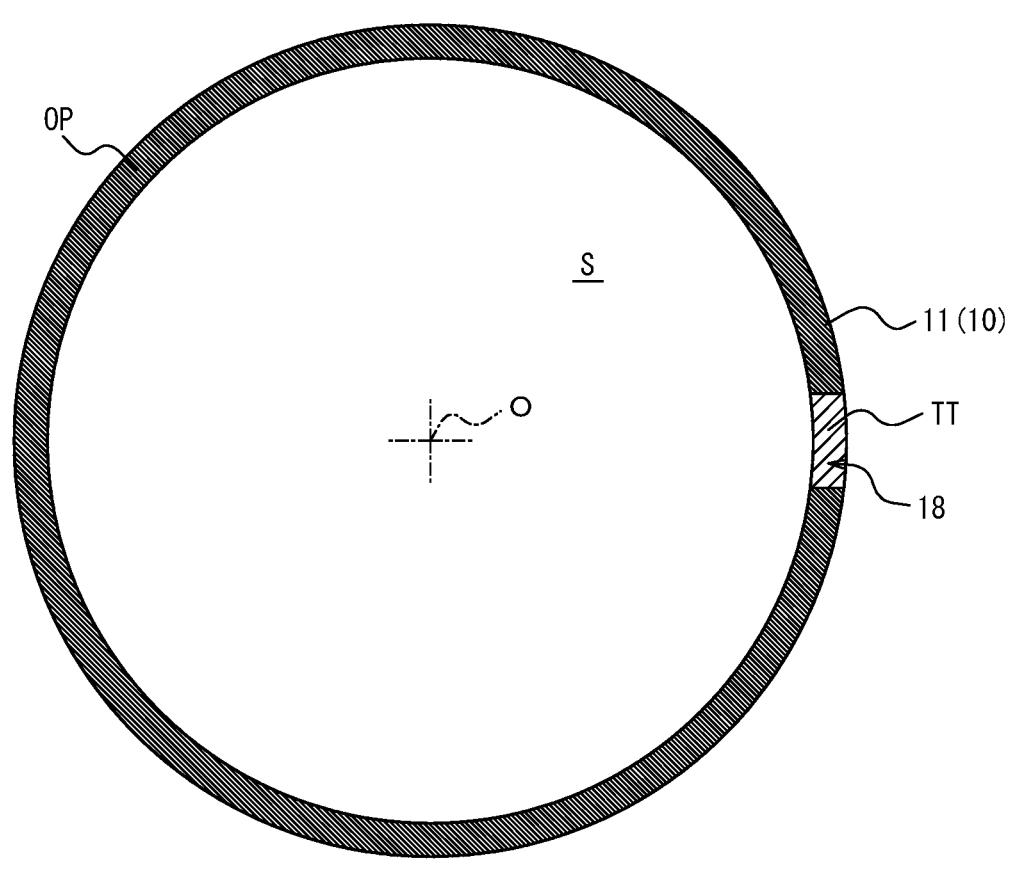
FIG. 16B is a cross-sectional view along the section D-D
of FIG. 15.

In the present embodiment, as illustrated in FIG. 16B, the container body 10 includes, at part in a circumferential direction, a window portion 18 through which the content liquid in the accommodation space S is visible. As illustrated in FIG. 15 and the like, the window portion 18 is provided in the shape of a vertical strip extending from an upper end of the outer tube 30 to the bottom portion 12 of the container body 10, as described later.

As illustrated in FIG. 16B, the container body 10 has a transparent resin layer TT, which forms the window portion 18, and an opaque resin layer OP, which has light-shielding properties, arranged adjacent to each other in the circumferential direction.

The container body 10 can be made of synthetic resin, such as polyethylene terephthalate (PET), polyethylene (PE), polypropylene (PP), or polystyrene (PS). The structure is not limited to a single-layer structure, but can also be laminated with, for example, ethylene vinyl alcohol copolymer (EVOH) resin, nylon resin, or the like with high gas barrier properties.

Figure 18:
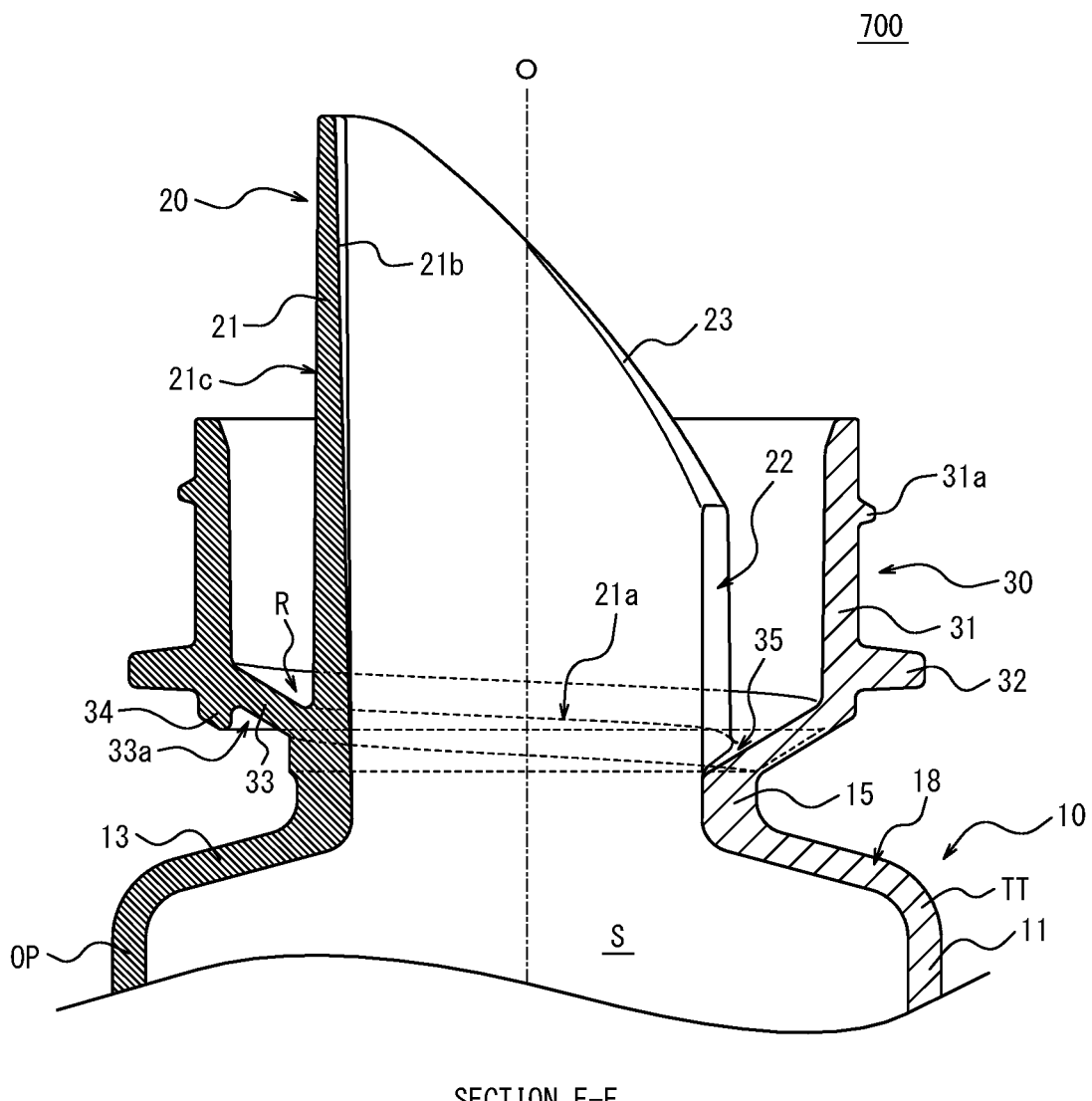
FIG. 18 is a cross-sectional view along the section E-E of
FIG. 16A.

As illustrated in FIGS. 15 and 18, the nozzle 20 is integrally molded with the container body 10 so as to be connected to an upper end of the opening portion 15 of the container body 10. In the present embodiment, the nozzle 20 is formed in the shape of the letter C in cross section, i.e. the shape of a gutter, with a notch 22 extending from one end to the other end along an axial direction at one circumferential point of a cylindrical tube wall 21. At a circumferential edge forming the notch 22 at an upper portion of the tube wall 21, a beveled portion 23 that is cut to be rounded when viewed from the side is formed. This configuration allows the content liquid contained in the accommodation space S of the container body 10 to be easily poured out at a desired position through the nozzle 20. The nozzle 20 protrudes upward from the upper end of the opening portion 15 and is formed of the same synthetic resin material as the container body 10. In the present embodiment, the nozzle 20 is made of the opaque resin layer OP (see FIG. 18). The nozzle 20 is provided with the notch 22 at a circumferential position at which the window portion 18 is provided in the container body 10. That is, the nozzle 20 is not provided with a window portion 18.

In the present embodiment, as illustrated in FIG. 16A, an outer peripheral surface 21c of the tube wall 21 is in the shape of an arc of a regular circle in plan view. In other words, although the tube wall 21 is not in the shape of a perfect regular circle in plan view due to the provision of the notch 22, the tube wall 21 is in the shape of an arc, which is part of a regular circle. The outer peripheral surface 21c of the tube wall 21 may have the same diameter from the bottom to the top as illustrated in the example in FIG. 15, or may have a diameter that is reduced or expanded from the bottom to the top. The tube wall 21 may have a shape other than a regular circle, such as an oval shape in plan view.

In the present embodiment, in order to discharge the content liquid from the nozzle 20 to a desired position, a pouring groove 21b that guides the content liquid to the desired position is provided at part of an inner peripheral surface of the tube wall 21 of the nozzle 20 in the circumferential direction. The configuration of the pouring groove 21b is similar to that of the second embodiment, so further explanation here is omitted.

The tip of the nozzle 20 is not limited to the beveled portion 23 that is cut to be rounded when viewed from the side, but can be of various shapes, such as straight inclined beveled portions.

On the radial outside of the nozzle 20, the outer tube 30 for attaching a cap 40 (see FIG. 19) is provided. As with the nozzle 20, the outer tube 30 is integrally molded with the container body 10 so as to be connected to the upper end of the opening portion 15 of the container body 10. The outer tube 30 includes an approximately cylindrical peripheral wall 31, an annular neck ring 32 protruding radially outward at a lower portion of the peripheral wall 31, and a bottom wall 33 inclined radially inward and downward from a lower end of the peripheral wall 31. An inner peripheral edge of the bottom wall 33 is connected to the upper end of the opening portion 15 of the container body 10. In the present embodiment, the container body 10, the nozzle 20, and the outer tube 30 (including the peripheral wall 31 and the bottom wall 33) are integrally molded of the same synthetic resin material.

In the present embodiment, the area enclosed by the tube wall 21 of the nozzle 20, the peripheral wall 31 of the outer tube 30, and the bottom wall 33 of the outer tube 30 functions as a liquid recovery channel R that returns the content liquid that has leaked to the radial outside of the nozzle 20 into the accommodation space S. In other words, the bottom wall 33 extending radially inward and downward from the lower end of the peripheral wall 31 of the outer tube 30 functions as a bottom wall 33 of the liquid recovery channel R.

In the present embodiment, in the outer tube 30, a window portion 18 is formed similarly at a circumferential position at which the window portion 18 is formed in the container body 10.

Thus, as illustrated in FIGS. 15 and 17, in the liquid container 700 according to the present embodiment, the vertical strip-shaped window portion 18 is formed, at a circumferential position at which the notch 22 is provided in the nozzle 20, so as to extend from the bottom portion 12 of the container body 10 to the upper end of the outer tube 30. This configuration prevents, in a case in which the liquid container 700 is formed by biaxial stretch blow molding of a preform 800 illustrated in FIG. 20, for example, the opaque resin layer OP adjacent to a flow of the transparent resin layer TT forming the vertical strip-shaped window portion 18 from mixing with the flow of the transparent resin layer TT during molding of the preform 800, as described below. Therefore, a window portion 118 of the preform 800 is not distorted, thus allowing improvement of the appearance of the liquid container 700 after biaxial stretch blow molding.

In the present embodiment, as illustrated in FIG. 16A, the circumferential position at which the window portion 18 is provided is configured to be completely contained within the circumferential position at which the notch 22 is provided. This configuration can prevent the opaque resin layer OP from mixing with the transparent resin layer TT that constitutes the window portion 18.

The configuration of the liquid recovery channel R, the notch 22, a connecting passage 35, a thinned portion 33a, and the peripheral wall 31 is similar to that of the first embodiment, except that the window portion 18 is provided in part, so a detailed description here is omitted. The configuration of the cap 40 is also similar to that of the first embodiment, so a detailed description here is omitted.

In the present embodiment, it is assumed that the cap 40 is formed of transparent resin, but is not limited to this aspect, and may be formed using resin with light-shielding properties by coloring or the like. In such a case, a transparent window may be provided at a circumferential position with a scale in order to facilitate measuring the content liquid.

Figure 19:
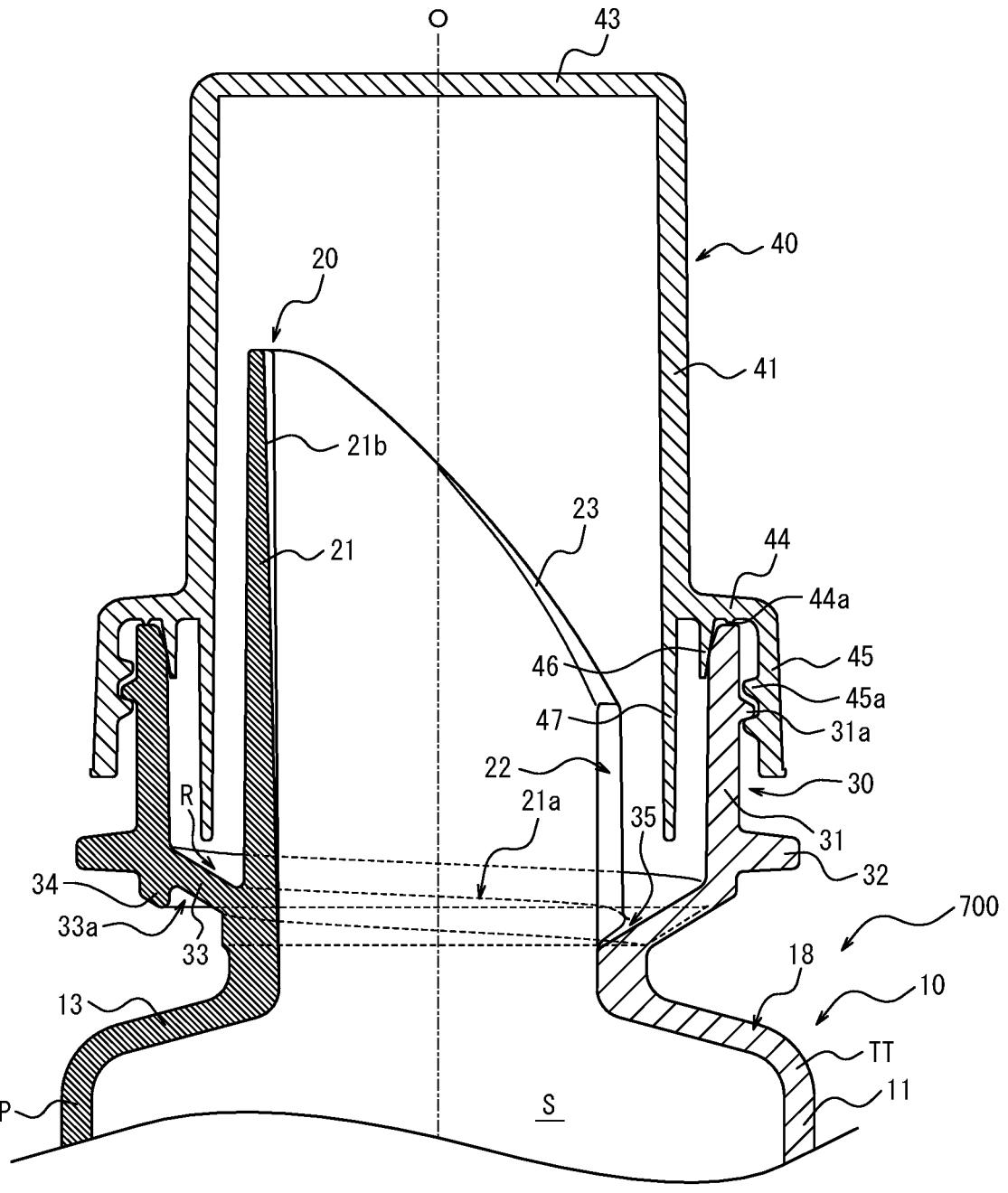
FIG. 19 is an enlarged front cross-sectional view illus-
trating a state in which a nozzle of FIG. 18 is covered with
a cap.

From a state illustrated in FIG. 19 in which the nozzle 20 is covered with the cap 40, the cap 40 is turned around a central axis O to release the screw engagement between the cap 40 and the outer tube 30 so that the cap 40 can be moved upward against the container body 10. The cap 40 can then be removed from the outer tube 30 by pulling the cap 40 upward with the screw engagement completely disengaged.

With the cap 40 removed from the outer tube 30 and the nozzle 20 exposed, the container body 10 can be tilted from an upright position with the tip of the nozzle 20 facing upward to an inclined position with the notch 22 facing upward. This allows the pouring groove 21*b* to be oriented downward, so the content liquid in the accommodation space S can be guided into the tube wall 21 through a nozzle opening 21*a*, and then poured out through the pouring groove 21*b* provided on the tip side of the tube wall 21.

The pouring groove 21*b* according to the present embodiment is configured so that the amount of a radially outward recess increases, as well as a circumferential width increases, as the pouring groove 21*b* nears the tip side. This configuration allows the content liquid that has been guided along the inner peripheral surface of the tube wall 21 to be gradually guided radially outward in the pouring groove 21*b*, thereby facilitating precisely discharging the content liquid at a desired position. It can also provide good drainage when pouring out the content liquid.

When the container body 10 is returned to the upright position after pouring out the content liquid, even if the content liquid adhering to the tip of the nozzle 20 drips down along the outer peripheral surface 21*c* of the nozzle 20, the content liquid does not drip down to the outside of the outer tube 30, but drips downward along the nozzle 20 and is received by the bottom wall 33 of the liquid recovery channel R. The content liquid that has dripped down into the liquid recovery channel R moves along the inclination of the upper surface of the bottom wall 33 and is returned to the accommodation space S of the container body 10 via the connecting passage 35. Therefore, this liquid container 700 can prevent dripping of the content liquid to the outside, while pouring out the content liquid from the nozzle 20.

After use, the nozzle 20 can be closed by attaching the cap 40 by screwing a female thread 45*a* of the cap 40 back into a male thread 31*a* of the outer tube 30.

Figure 20:
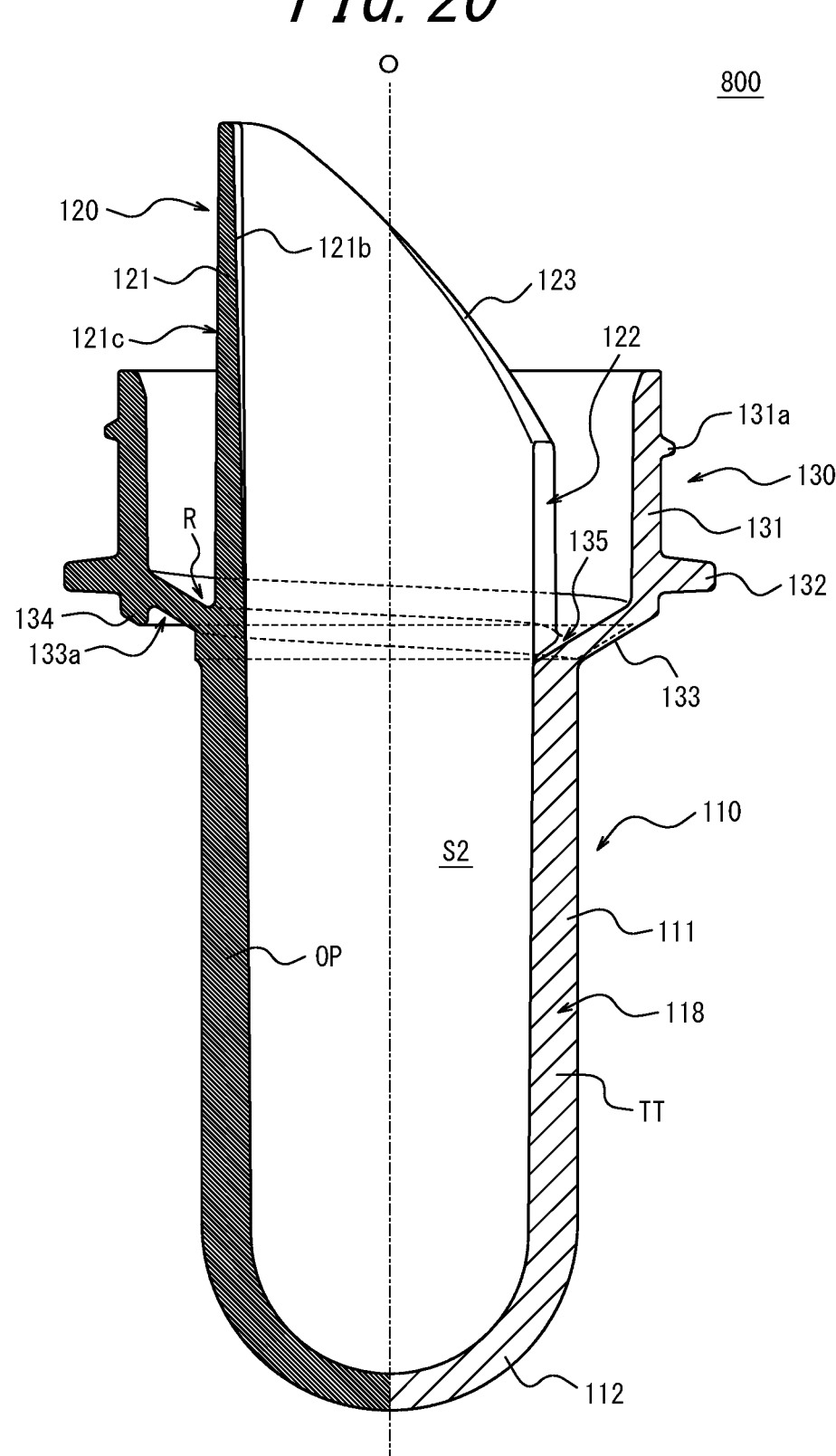
FIG. 20 is a front cross-sectional view of a preform used
in the manufacture of the liquid container according to the
fourth embodiment of the disclosure.

To form the liquid container 700 according to the present embodiment, for example, the preform 800 illustrated in FIG. 20 is integrally molded by injection molding or the like. Then, an outer edge portion 134 of a bottom wall 133 of the liquid recovery channel R is butted against a reference plane of a blow molding die so as to secure the preform 800 to the die, and biaxial stretch blow molding is performed.

The preform 800 includes a main body 110 having the shape of a test tube, and a nozzle 120 and an outer tube 130 that are integrally molded at an upper end of the main body 110. The main body 110 includes a cylindrical body portion 111, and an approximately hemispherical bottom portion 112 that closes a lower end of the body portion 111. The main body 110 is a portion that forms the opening portion 15, the shoulder portion 13, the body portion 11, and the bottom portion 12 of the liquid container 700 by biaxial stretch blow molding of the preform 800, and has an interior space S2.

As illustrated in FIG. 20, the main body 110 of the preform 800, as with the container body 10 of the liquid container 700, has a window portion 118 made of transparent resin in part in a circumferential direction. As illustrated in FIG. 20, the window portion 118 is provided in the shape of a vertical strip extending from an upper end of the outer tube 130 to the bottom portion 112 of the main body 110.

The main body 110 includes a transparent resin layer TT portion that forms the window portion 118 and an opaque resin layer OP portion that has light-shielding properties.

The nozzle 120 and the outer tube 130 of the preform 800 have the same shapes as the nozzle 20 and the outer tube 30 of the liquid container 700, and are parts that do not deform (expand) during biaxial stretch blow molding. As illustrated in FIG. 20, the nozzle 120 is formed in the shape of the letter C in cross section, i.e. the shape of a gutter, with a notch 122 extending from one end to the other end along an axial direction at one circumferential point of the cylindrical tube wall 121. A beveled portion 123 that is cut to be rounded when viewed from the side is formed at a circumferential edge forming the notch 122 at an upper portion of the tube wall 121.

In the present embodiment, the nozzle 120 is provided with the notch 122 at the circumferential position at which the window portion 118 is provided in the main body 110, and the nozzle 120 is not provided with a window portion 118.

In the present embodiment, an outer peripheral surface 121*c* of the tube wall 121 is in the shape of an arc of a regular circle in plan view. In other words, although the tube wall 121 is not in the shape of a perfect regular circle in plan view due to the provision of the notch 122, the tube wall 121 is in the shape of an arc, which is part of a regular circle. With the above configuration, the outer peripheral surface 121*c* of the tube wall 121 is located on a regular circle at all areas in plan view. With this configuration, when the nozzle 120 and the main body 110 of the preform 800 are integrally molded with a die, a die part for molding the nozzle 120 and a die part for molding the main body 110 can both include a regular circular shape or an arc shape of a regular circle. Therefore, since matching surfaces of the die parts can be made into the shapes of regular circles, the molding accuracy of each die part can be increased, and eccentricity can be prevented due to increase in the alignment accuracy of the die part for molding the main body 110 with respect to the die part for molding the nozzle 120. Therefore, it is possible to prevent eccentricity of the container body 10 in the liquid container 700.

In the present embodiment, a pouring groove 121*b* that guides the content liquid to a desired position is provided in part of an inner peripheral surface of the tube wall 121 of the nozzle 120 in the circumferential direction.

As illustrated in FIG. 20, the pouring groove 121*b* according to the present embodiment is provided at a circumferential position opposite the notch 122 in the inner peripheral surface of the tube wall 121 of the nozzle 120. The pouring groove 121*b* is recessed radially outward from the inner peripheral surface of the tube wall 121 as illustrated in FIG. 20, and extends to an upper end of the tube wall 121. In the present embodiment, the pouring groove 121*b* is configured so that the amount of a radially outward recess increases, as well as a circumferential width increases, as the pouring groove 121*b* nears the upper end (tip). This configuration allows the content liquid that has been guided along the inner peripheral surface of the tube wall 21 of the liquid container 700 to be gradually guided radially outward in the pouring groove 21*b*, thereby facilitating precisely discharging the content liquid at a desired position. It can also provide good drainage when pouring out the content liquid.

The outer tube 130 of the preform 800 includes an approximately cylindrical peripheral wall 131, an annular neck ring 132 protruding radially outward at a lower portion of the peripheral wall 131, and a bottom wall 133 inclined radially inward and downward from a lower end of the peripheral wall 131. An inner peripheral edge of the bottom wall 133 is connected to an upper end of the main body 110.

In the present embodiment, in the outer tube 130, a window portion 118 is formed similarly at a circumferential position at which the window portion 118 is provided in the main body 110.

As illustrated in FIG. 20, in the preform 800, the vertical strip-shaped window portion 118 is formed, at a circumferential position at which the notch 122 is provided in the nozzle 120, so as to extend from the bottom portion 112 of the main body 110 to the upper end of the outer tube 130. This configuration prevents the occurrence of turbulence in a flow of the vertical strip-shaped transparent resin layer TT during the manufacture of the preform 800, thus preventing distortion of the window portion 118 of the preform 800 and improving the appearance of the liquid container 700 after biaxial stretch blow molding.

The reason why the window portion 18 of the preform 800 is less prone to distortion will be described below.

A cylindrical molten resin body with a transparent resin forming the window portion 118 and an opaque resin that is adjacent to the transparent resin in a circumferential direction is injected into a cavity from a nozzle portion of an injection molding machine for the preform 800. This molten resin body has the transparent resin, which corresponds to the window portion 118 of the preform 800, at one point in the circumferential direction.

The vertical strip-shaped transparent resin formed within the molten resin body injected into the cavity proceeds through the cavity in a direction from the bottom portion 112 to an opening portion of the preform 800, and forms the window portion 118. As illustrated in FIG. 20, the preform 800 according to the present embodiment is configured so that the circumferential position at which the notch 122 is provided contains the circumferential position at which the window portion 118 is formed. In other words, at the circumferential position at which the window portion 118 is formed, the nozzle 120 is not present by being cut out by the notch 122. Therefore, when the vertical strip-shaped transparent resin injected from a gate reaches the upper end of the main body 110 in FIG. 20, the transparent resin does not flow to the side of the nozzle 120, but reaches the upper end of the outer tube 130 through the bottom wall 133 and the peripheral wall 131 of the outer tube 130.

Thus, in the present embodiment, the transparent resin layer TT forming the window portion 118 does not flow to the side of the nozzle 120 at the upper end of the main body 110, but flows on the side of the outer tube 130 to the upper end. With this configuration, since the transparent resin layer TT forming the window portion 118 is not divided into two paths at the upper end of the main body 110, the flow of molten resin is stabilized and formed into the shape of a vertical strip without mixing of the opaque resin layer OP adjacent thereto.

On the other hand, if the nozzle 120 is not provided with the notch 122 or if the circumferential positions of the notch 122 and the window portion 118 are misaligned, the transparent resin that has reached the upper end of the main body 110 is divided into and flows to the side of the outer tube 130 and the side of the nozzle 120. This tends to cause the opaque resin to mix irregularly with the transparent resin. Also, the transparent resin flowing in the nozzle 120 tends to flow at an angle along the beveled portion 123 (to the tip of the nozzle 120). On the other hand, in the present embodiment, since the notch 122 of the nozzle 120 is provided at the circumferential position at which the transparent resin flows, the transparent resin forming the window portion 118 does not flow to the side of the nozzle 120, and the transparent resin layer TT can be formed into the shape of a vertical strip to maintain a good appearance.

In the present embodiment, the area enclosed by the tube wall 121 of the nozzle 120, the peripheral wall 131 of the outer tube 130, and the bottom wall 133 of the outer tube 130 forms the liquid recovery channel R. A thinned portion 133*a* that is recessed upward is formed in a lower surface of the bottom wall 133, and an outer edge portion 134 of the bottom wall 133, which is not thinned, extends to approximately the same height in the circumferential direction.

When forming the liquid container 700 using the preform 800 illustrated in FIG. 20, the outer edge portion 134 of the bottom wall 133 of the preform 800 is butted against and secured to the reference plane of the blow molding die, and a pressurized fluid is supplied to the interior of the preform 800, while the main body 110 is stretched axially by a stretch rod, to perform biaxial stretch blow molding. In the present embodiment, only the main body 110 is axially and radially stretched by blow molding to form the liquid container 700 by forming the opening portion 15, the shoulder portion 13, the body portion 11, and the bottom portion 12 illustrated in FIG. 15.

In this method of manufacturing the liquid container 700, the liquid container 700 in which the container body 10, the nozzle 20, and the outer tube 30 (including the peripheral wall 31 and the bottom wall 33) are integrally molded can be formed by expanding only the main body 110 of the preform 800, in which the main body 110, the nozzle 120, and the outer tube 130 (including the peripheral wall 131 and the bottom wall 133) are integrally molded, by biaxial stretch blow molding. Since the liquid recovery channel R is compartmentally formed by the nozzle 20 and the outer tube 30, the liquid container 700 is a container in which the container body 10, the nozzle 20, and the liquid recovery channel R are integrally molded.

As described above, the present embodiment is the liquid container 700 including the container body 10 that compartmentally forms the accommodation space S for the content liquid, the cylindrical nozzle 20 that is connected to an upper portion of the container body 10 and guides the content liquid to the outside, and the liquid recovery channel R that returns the content liquid on the radial outside of the nozzle 20 into the accommodation space S through the notch 22 provided at part of the nozzle 20 in the circumferential direction. The container body 10, the nozzle 20, and the liquid recovery channel R are formed by integral molding. The container body 10 and the liquid recovery channel R are configured to include, at part in the circumferential direction, the vertical strip-shaped window portion 18 through which the content liquid in the accommodation space S is visible. The circumferential position at which the notch 22 is provided is configured to contain the circumferential position at which the window portion 18 is provided. By adopting such a configuration, it is possible to effectively prevent dripping of the content liquid to the outside, while pouring out the content liquid from the nozzle 20. In addition, since the container body 10, the nozzle 20, and the liquid recovery channel R are integrally molded, the amount of resin used can be reduced, and since there is no need to separate the nozzle cap from the container body, sort and disposal become easier.

The term "sort and disposal become easier" here is used as the same meaning as in the second embodiment.

In addition, since the present embodiment is configured with the vertical strip-shaped window portion 18 through which the content liquid in the accommodation space S of the container body 10 is visible, users can easily check the amount of the content liquid remaining in the accommodation space S through the window portion 18.

In particular, in the present embodiment, the opaque resin adjacent to the vertical strip-shaped transparent resin is less likely to be irregularly mixed with the transparent resin during the manufacture of the preform 800 for blow molding the liquid container 700, so the window portion 118 of the preform 800 is not distorted, thus allowing improvement of the appearance of the liquid container 700 after biaxial stretch blow molding.

Although the disclosure has been described based on the drawings and examples, it should be noted that one skilled in the art can easily make various variations and modifications based on the disclosure. Accordingly, it should be noted that these variations and modifications are included in the disclosure. For example, functions and the like included in each component can be rearranged in a logically consistent manner, and multiple components can be combined into one or divided. It should be understood that these are also included in the disclosure.

For example, in the first to fourth embodiments, the notch 22 provided in the nozzle 20 is configured to constitute the connecting passage 35 that connects the liquid recovery channel R with the accommodation space S, but is not limited to this aspect. The tube wall 21 of the nozzle 20 or the liquid recovery channel R may be configured with a connecting hole that connects the liquid recovery channel R with the accommodation space S.

In the first, second, and fourth embodiments, the bottom wall 33 of the liquid recovery channel R is configured to be provided with the thinned portion 33a that is recessed upward from the lower surface on the radial inside of the bottom wall 33, but is not limited to this aspect. The bottom wall 33 may be provided with no thinned portion 33a, or the thinned portion 33a on the radial outside or radial middle of the bottom wall 33.

In the second and fourth embodiments, the pouring groove 21b is configured so that the amount of the radially outward recess increases, as well as the circumferential width increases, as the pouring groove 21b nears the upper end, but is not limited to this aspect. The circumferential width and the amount of the radially outward recess of the pouring groove 21b can be set arbitrarily, as long as the pouring groove 21b is a groove provided at part of the inner peripheral surface of the tube wall 21 of the nozzle 20 in the circumferential direction.

In the third embodiment, the lower end of the measuring tube 47a is configured to extend downward beyond the nozzle 20 and into the headspace HS in the container body 10, but is not limited to this aspect. The lower end of the measuring tube 47a may be positioned above the lower end of the nozzle 20 or may be immersed in the content liquid beyond the headspace HS.

In the third embodiment, the vertical distance RH from the lower end of the attachment tube 45 to the lower end of the measuring tube 47a is configured to be greater than the vertical distance NH from the upper end of the outer peripheral wall of the liquid recovery channel R to the upper end of the nozzle 20, but is not limited to this aspect. The vertical distance RH may be less than or equal to the vertical distance NH.

In the fourth embodiment, the window portion 18 has the single-layer structure constituted of the transparent resin layer TT, but is not limited to this aspect. The window portion 18 may have a laminated structure with other functional layers. The window portion 18 does not necessarily need to be composed of a completely transparent resin layer, but may be composed of a translucent resin layer, as long as the window portion 18 has enough transparency and visible light transmittance to allow viewing of the remaining amount of the content liquid.

In the fourth embodiment, the area excluding the window portion 18 is configured to have the single-layer structure constituted of the opaque resin layer OP, but is not limited to this aspect. The area excluding the window portion 18 may have a laminated structure of two or more layers. In the case of a laminated structure, at least one layer is preferably made of opaque resin to ensure light-shielding properties.

REFERENCE SIGNS LIST

10 container body
11 body portion
12 bottom portion
13 shoulder portion
15 opening portion
15a neck portion
18 window portion
20 nozzle
21 tube wall
21a nozzle opening
21b pouring groove
21c outer peripheral surface of tube wall
22 notch
23 beveled portion
30 outer tube
31 peripheral wall (outer peripheral wall)
31a male thread
32 neck ring
33 bottom wall
33a thinned portion
34 outer edge portion
35 connecting passage
40 cap
41 outer peripheral wall
43 top wall
44 flange portion
44a sealing protrusion
45 attachment tube
45a female thread
46 sealing wall
47 inner tube
47a measuring tube
100, 300, 500, 700 liquid container
110 main body
111 body portion
112 bottom portion
120 nozzle
121 tube wall
121b pouring groove
121c outer peripheral surface of tube wall
122 notch
123 beveled portion
130 outer tube
131 peripheral wall
132 neck ring
133 bottom wall
133a thinned portion 134 outer edge portion
200, 400, 600, 800 preform
HS headspace
O central axis
OP opaque resin layer
R liquid recovery channel
S accommodation space
S2 interior space
TT transparent resin layer

The invention claimed is:

1. A liquid container comprising:
a container body configured to compartmentally form an accommodation space for content liquid;
a tubular nozzle connected to an upper portion of the container body and configured to guide the content liquid to outside; and
a liquid recovery channel configured to return the content liquid radially outside of the nozzle into the accommodation space, wherein
the container body, the nozzle, and the liquid recovery channel are integrally molded, and
a bottom wall of the liquid recovery channel has a thinned portion that is recessed upward from a lower surface of the bottom wall, and each radial position in the lower surface of the bottom wall, except for the thinned portion, is horizontal around a respective circumference.

2. The liquid container according to claim 1, wherein the liquid recovery channel is inclined downward toward a circumferential direction, and a connecting passage that connects the liquid recovery channel with the accommodation space is at a lower end of the liquid recovery channel.

3. The liquid container according to claim 1, wherein a bottom wall of the liquid recovery channel has a thinned portion that is recessed upward from a lower surface of the bottom wall, and a thickness of the bottom wall at an area with the thinned portion is constant in a direction along the liquid recovery channel.

4. The liquid container according to claim 1, wherein an upper surface of a bottom wall of the liquid recovery channel is inclined downward from the radial outside to radial inside.

5. The liquid container according to claim 1, wherein an outer tube is formed on the radial outside of the nozzle, and the liquid recovery channel is formed at a radial position between the nozzle and the outer tube.

6. The liquid container according to claim 1, further comprising a cap configured to cover the nozzle from above, wherein
the cap has a measuring tube in shape of a cylinder with a top, and
when the cap is attached, the measuring tube is disposed on a radial inside of the nozzle.

7. The liquid container according to claim 6, wherein when the cap is attached, a lower end of the measuring tube extends downward beyond the nozzle and is disposed inside the container body.

8. The liquid container according to claim 6, wherein the container body includes a body portion configured to compartmentally form the accommodation space for the content liquid, a bottom portion configured to close a lower end of the body portion, and a neck portion configured to be connected to an upper end of the body portion and have a reduced diameter than the body portion, and a radial distance between an outer peripheral surface of the measuring tube and an inner peripheral surface of the neck portion is 1 millimeter or more and 3 millimeters or less.

9. The liquid container according to claim 6, wherein the cap further includes an attachment tube configured to be attached to an outer peripheral wall of the liquid recovery channel, and a vertical distance from a lower end of the attachment tube to a lower end of the measuring tube is greater than a vertical distance from an upper end of the outer peripheral wall of the liquid recovery channel to an upper end of the nozzle.

10. The liquid container according to claim 6, wherein a radial width of the liquid recovery channel is 3 millimeters or more.

11. A liquid container with content liquid comprising content liquid contained in the accommodation space in the liquid container according to claim 7,
wherein when the cap is attached, the lower end of the measuring tube is located, in the container body, inside a headspace in which no content liquid is contained.

12. A liquid container comprising:
a container body configured to compartmentally form an accommodation space for content liquid;
a tubular nozzle connected to an upper portion of the container body and configured to guide the content liquid to outside; and
a liquid recovery channel configured to return the content liquid radially outside of the nozzle into the accommodation space, wherein
the container body, the nozzle, and the liquid recovery channel are integrally molded, wherein
a pouring groove that is recessed radially outward and extends to an upper end of a tube wall of the nozzle is at part of an inner peripheral surface of the tube wall of the nozzle in the circumferential direction,
an outer peripheral surface of the tube wall of the nozzle is located on a regular circle in plan view, and
an amount of a radially outward recess of the pouring groove increases, as well as a circumferential width of the pouring groove increases, as the pouring groove nears the upper end.

13. A liquid container comprising:
a container body configured to compartmentally form an accommodation space for content liquid;
a tubular nozzle connected to an upper portion of the container body and configured to guide the content liquid to outside; and
a liquid recovery channel configured to return the content liquid radially outside of the nozzle into the accommodation space, wherein
the container body, the nozzle, and the liquid recovery channel are integrally molded, wherein
the liquid recovery channel is configured to return the content liquid on the radially outside of the nozzle into the accommodation space through a notch provided at part of the nozzle in a circumferential direction,
the container body and the liquid recovery channel have, at part in the circumferential direction, a vertical strip-shaped window portion through which the content liquid in the accommodation space is visible, and
a circumferential position of the notch contains a circumferential position of the window portion.

* * * * *